(12) United States Patent
Tinnakornsrisuphap et al.

(10) Patent No.: US 8,989,138 B2
(45) Date of Patent: Mar. 24, 2015

(54) WIRELESS COMMUNICATION SYSTEMS WITH FEMTO NODES

(75) Inventors: Peerapol Tinnakornsrisuphap, San Diego, CA (US); Sanjiv Nanda, San Diego, CA (US); Manoj M. Deshpande, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1071 days.

(21) Appl. No.: 12/502,098

(22) Filed: Jul. 13, 2009

(65) Prior Publication Data

US 2010/0040019 A1    Feb. 18, 2010

Related U.S. Application Data

(60) Provisional application No. 61/081,006, filed on Jul. 15, 2008.

(51) Int. Cl.
*H04W 36/00* (2009.01)
*H04W 8/26* (2009.01)

(52) U.S. Cl.
CPC ...................................... *H04W 8/26* (2013.01)
USPC ........... 370/331; 370/338; 455/436; 455/438; 455/446

(58) Field of Classification Search
CPC .... H04W 36/08; H04W 84/045; H04W 48/20
USPC .......... 370/331, 338, 328; 455/436, 438, 446, 455/410, 401
See application file for complete search history.

(56) References Cited

U.S. PATENT DOCUMENTS

| | | | |
|---|---|---|---|
| 5,345,467 A | 9/1994 | Lomp et al. | |
| 5,722,073 A | 2/1998 | Wallstedt et al. | |
| 6,032,047 A | 2/2000 | Cerwall et al. | |
| 6,044,272 A | 3/2000 | Kobylinski et al. | |
| 6,201,969 B1 | 3/2001 | Meier | |
| 6,285,874 B1 | 9/2001 | Magnusson et al. | |
| 6,353,602 B1 | 3/2002 | Cheng et al. | |
| 6,522,881 B1 * | 2/2003 | Feder et al. | 455/437 |

(Continued)

FOREIGN PATENT DOCUMENTS

| | | |
|---|---|---|
| CN | 1568043 A | 1/2005 |
| CN | 1934884 A | 3/2007 |

(Continued)

OTHER PUBLICATIONS

International Search Report and Written Opinion—PCT/US2009/050585, International Search Authority—European Patent Office—Nov. 19, 2009.

(Continued)

*Primary Examiner* — Rasheed Gidado

(57) ABSTRACT

Systems and methods for performing a handoff of an access terminal from a macro node to a femto node are disclosed. In one embodiment, the femto node is configured to transmit a predetermined signal for determining signal quality and an identifier that uniquely identifies the femto node to the access terminal. The access terminal is configured to transmit the identifier to the macro node. The femto node is identified as a hand in target based on the transmitted identifier and the macro node is configured to hand in the access terminal to the femto node.

52 Claims, 13 Drawing Sheets

(56) References Cited

U.S. PATENT DOCUMENTS

| | | |
|---|---|---|
| 6,553,230 B1 | 4/2003 | Plestid et al. |
| 6,597,671 B1 | 7/2003 | Ahmadi et al. |
| 6,615,050 B1 | 9/2003 | Tiedemann, Jr. et al. |
| 6,680,920 B1 | 1/2004 | Wan |
| 6,873,612 B1 | 3/2005 | Steer et al. |
| 7,310,518 B2 | 12/2007 | Chambers |
| 7,596,378 B1 | 9/2009 | Nizri et al. |
| 7,813,320 B2* | 10/2010 | Kim et al. ............... 370/331 |
| 8,027,681 B2* | 9/2011 | Burgess et al. ............... 455/436 |
| 2001/0000136 A1 | 4/2001 | Dixon et al. |
| 2004/0063428 A1 | 4/2004 | Jansson |
| 2004/0138807 A1 | 7/2004 | Jha et al. |
| 2004/0240474 A1 | 12/2004 | Fan |
| 2005/0030924 A1 | 2/2005 | Yano et al. |
| 2005/0048922 A1 | 3/2005 | Lee et al. |
| 2005/0148368 A1 | 7/2005 | Scheinert et al. |
| 2005/0243772 A1 | 11/2005 | Lee et al. |
| 2006/0056351 A1 | 3/2006 | Wall |
| 2006/0098752 A1 | 5/2006 | Song et al. |
| 2006/0146751 A1* | 7/2006 | Obuchi et al. ............... 370/331 |
| 2006/0172707 A1 | 8/2006 | Stern-Berkowitz et al. |
| 2006/0234713 A1 | 10/2006 | Oswal et al. |
| 2006/0280141 A1 | 12/2006 | McBeath et al. |
| 2007/0097914 A1 | 5/2007 | Grilli et al. |
| 2007/0097938 A1* | 5/2007 | Nylander et al. ............... 370/338 |
| 2007/0097939 A1 | 5/2007 | Nylander et al. |
| 2007/0135147 A1 | 6/2007 | DeClerck et al. |
| 2007/0153728 A1 | 7/2007 | Le et al. |
| 2007/0213086 A1 | 9/2007 | Claussen et al. |
| 2007/0287501 A1 | 12/2007 | Hoshina et al. |
| 2007/0291699 A1 | 12/2007 | Lee et al. |
| 2007/0291728 A1 | 12/2007 | Dalsgaard et al. |
| 2007/0298803 A1 | 12/2007 | Kawabata et al. |
| 2008/0132239 A1* | 6/2008 | Khetawat et al. ............... 455/438 |
| 2008/0146226 A1 | 6/2008 | Claussen et al. |
| 2008/0153497 A1* | 6/2008 | Kalhan ............... 455/436 |
| 2008/0159222 A1 | 7/2008 | Akram et al. |
| 2008/0207207 A1 | 8/2008 | Moe et al. |
| 2008/0227458 A1 | 9/2008 | Wu |
| 2008/0267153 A1 | 10/2008 | Mukherjee et al. |
| 2009/0016314 A1 | 1/2009 | Kim |
| 2009/0047955 A1 | 2/2009 | Frenger et al. |
| 2009/0047960 A1 | 2/2009 | Gunnarsson et al. |
| 2009/0052395 A1* | 2/2009 | Bao et al. ............... 370/331 |
| 2009/0052418 A1* | 2/2009 | Semper ............... 370/338 |
| 2009/0092107 A1 | 4/2009 | Cai et al. |
| 2009/0093252 A1* | 4/2009 | Czaja et al. ............... 455/436 |
| 2009/0097448 A1* | 4/2009 | Vasudevan et al. ............ 370/331 |
| 2009/0097451 A1* | 4/2009 | Gogic ............... 370/331 |
| 2009/0132674 A1 | 5/2009 | Horn et al. |
| 2009/0132675 A1 | 5/2009 | Horn et al. |
| 2009/0156208 A1 | 6/2009 | Vesterinen et al. |
| 2009/0168745 A1 | 7/2009 | Ahmadi et al. |
| 2009/0176490 A1 | 7/2009 | Kazmi et al. |
| 2009/0196253 A1* | 8/2009 | Semper ............... 370/331 |
| 2009/0219888 A1* | 9/2009 | Chen et al. ............... 370/331 |
| 2009/0233607 A1 | 9/2009 | Claussen et al. |
| 2009/0270097 A1 | 10/2009 | Gallagher et al. |
| 2009/0275333 A1 | 11/2009 | Ishii et al. |
| 2009/0280819 A1* | 11/2009 | Brisebois et al. ............... 455/446 |
| 2009/0298515 A1* | 12/2009 | Czaja et al. ............... 455/456.5 |
| 2009/0312024 A1* | 12/2009 | Chen et al. ............... 455/437 |
| 2009/0316654 A1 | 12/2009 | Prakash et al. |
| 2009/0316655 A1 | 12/2009 | Prakash et al. |
| 2010/0040038 A1 | 2/2010 | Tinnakornsrisuphap et al. |
| 2010/0130199 A1 | 5/2010 | Piercy et al. |
| 2010/0260068 A1* | 10/2010 | Bhatt et al. ............... 370/254 |
| 2011/0014920 A1* | 1/2011 | Nylander et al. ............... 455/442 |
| 2011/0039557 A1 | 2/2011 | Narasimha et al. |
| 2011/0051658 A1 | 3/2011 | Jin et al. |
| 2011/0263274 A1 | 10/2011 | Fox et al. |

FOREIGN PATENT DOCUMENTS

| | | |
|---|---|---|
| EP | 1107637 A1 | 6/2001 |
| EP | 1928194 A1 | 6/2008 |
| EP | 2079263 A1 | 7/2009 |
| JP | 2000312379 A | 11/2000 |
| JP | 2002525913 A | 8/2002 |
| JP | 2003219459 A | 7/2003 |
| JP | 2004140459 A | 5/2004 |
| JP | 2006141031 A | 6/2006 |
| JP | 2006518129 A | 8/2006 |
| JP | 2008005074 A | 1/2008 |
| JP | 2008053870 A | 3/2008 |
| JP | 2008118227 A | 5/2008 |
| JP | 2010500793 A | 1/2010 |
| JP | 2010514352 A | 4/2010 |
| JP | 2010517366 A | 5/2010 |
| KR | 20060128694 A | 12/2006 |
| KR | 20070051954 A | 5/2007 |
| KR | 100777096 B1 | 11/2007 |
| RU | 2209528 C2 | 7/2003 |
| RU | 2005108595 | 8/2005 |
| RU | 2265287 C2 | 11/2005 |
| RU | 2292665 C2 | 1/2007 |
| RU | 2316894 C2 | 2/2008 |
| RU | 2341900 C2 | 12/2008 |
| TW | 200820809 A | 5/2008 |
| WO | 9637079 | 11/1996 |
| WO | 9839940 | 9/1998 |
| WO | 0016518 A2 | 3/2000 |
| WO | 0167788 A2 | 9/2001 |
| WO | 0243430 A1 | 5/2002 |
| WO | 2004010607 A1 | 1/2004 |
| WO | 2004019650 | 3/2004 |
| WO | 2004064294 | 7/2004 |
| WO | WO-2004114695 A1 | 12/2004 |
| WO | 2005029894 A1 | 3/2005 |
| WO | 2005078966 A1 | 8/2005 |
| WO | 2005107169 A1 | 11/2005 |
| WO | 2007010304 | 1/2007 |
| WO | 2007051182 A1 | 5/2007 |
| WO | WO-2007094320 A1 | 8/2007 |
| WO | WO2007103062 A1 | 9/2007 |
| WO | 2007113154 A1 | 10/2007 |
| WO | 2008019557 A1 | 2/2008 |
| WO | WO2008055251 | 5/2008 |
| WO | 2008076222 | 6/2008 |
| WO | WO2008073554 | 6/2008 |
| WO | 2008094333 A1 | 8/2008 |
| WO | 2008104196 | 9/2008 |
| WO | WO2009064647 | 5/2009 |
| WO | WO2009067454 | 5/2009 |

OTHER PUBLICATIONS

International Search Report and Written Opinion—PCT/US2009/050586, International Search Authority—European Patent Office—Nov. 25, 2009.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP Standard; 3GPP TS 36.300,3rd Generation Partnership Project (3GPP), Mobile Competence Centre ; 650, Route Des Lucioles ; F-06921 Sophiaantipoliscedex ; France, No. V8.4.0, Mar. 1, 2008, pp. 1-126, XP050377579.

"3rd Generation Partnership Project; Technical Specification Group Radio Access Network; Evolved Universal Terrestrial Radio Access (E-UTRA) Radio Resource Control (RRC); Protocol specification (Release 8)" 3GPP Standard; 3GPP TS 36.331, 3rd Generation Partnership Project (3GPP), Mobile Competence Centre; 650, Route Des Lucioles ; F-06921 Sophia-Antipolis Cedex; France, No. V8.2.0, May 1, 2008, pp. 1-151, XP050377645.

Ericsson: "Automatic neighbour cell configuration", 3GPP Draft; S5-071484, 3rd Generation Partnership Project (3GPP), Mobile Competence Centre; Sophia-Antipolis Cedex ; France, (Aug. 2007), XP050306143, paragraph 3.4.

(56) References Cited

OTHER PUBLICATIONS

Ericsson: "MCI conflict detection and resolution", 3GPP Draft; S5-071569, 3rd Generation Partnership Project (3GPP), Mobile Competence Centre; Sophia-Antipolis Cedex; France, XP050306211, (Aug. 2007).

Huawei: "Detection of conflicting cell identities," 3GPP Draft; R3-071947, 3rd Generation Partnership Project (3GPP), Mobile Competence Centre; Sophia-Antipolis Cedex ; France , XP050162733 [retrieved on Oct. 3, 2007] the whole document.

Huawei, "Detection of conflicting cell identities", 3GPP TSG-RAN-WG2 Meeting #59bis, R2-074216, Oct. 2007, p. 1-p. 3, URL:http://www.3gpp.org/ftp/tsg_ran/WG2_RL2/TSGR2_59bis/Docs/R2-074216.zip.

Panasonic: "UE access control in CSG cell," 3GPP Draft; R2-082238, 3rd Generation Partnership Project (3GPP), Kansas City, USA, XP050140005, figures 1-3 paragraph [2.1]—paragraph [2.3], (Apr. 29, 2008).

Qualcomm Europe and T-Mobile: "Inter-RAT/frequency Automatic Neighbour Relation Function," 3GPP Draft TSG RAN#60; R2-074907, 3rd Generation Partnership Project (3GPP), Jeju, South Korea, XP050137407 figure 1 p. 2-p. 3, (Nov. 5-9, 2007).

Qualcomm Europe: "Connected mode mobility in the presence of PCI confusion", 3GPP Draft; R3-090699, 3rd Generation Partnership Project (3GPP), Mobile Competence Centre ; 650, Route Des Lucioles ; F-06921 Sophia-Antipolis Cedex ; France, No. Seoul, Korea; Mar. 18, 2009, XP050341086, [retrieved on Mar. 18, 2009].

Qualcomm Europe (Email Rapporteur): "Summary of email discussion on Home eNB inbound mobility support [61b-LTE-B06]," 3GPP Draft TSG-RAN WG 2 meeting #62; R2-082270, 3rd Generation Partnership Project (3GPP), Kansas City, USA, XP050140027, (Apr. 29, 2008).

Qualcomm Europe et al.,"Network based solutions to inbound mobility in the presence of PCI confusion", 3GPP Draft; R3-091378, 3rd Generation Partnership Project (3GPP), Mobile Competence Centre ; 650, Route Des Lucioles ; F-06921 Sophia-antipolis Cedex ; France, No. San Francisco, USA; May 4, 2009, XP050341712, [retrieved on May 4, 2009].

Qualcomm Europe, "Optimized handover in the presence of PCI confusion", 3GPP Draft,R2-083268,3rd Generation Partnership Project (3GPP),Mobile Competence Centre,650,Route Des Lucioles,F-06921 Sophia-Antipolis Cedex ,France, vol. RAN WG2, No. Warsaw, Poland, 20080624, Jun. 24, 2008, XP050140688.

Taiwan Search Report—TW098123783—TIPO—Aug. 16, 2012.

T-Mobile: "Automatic Neighbour Cell List Configuration—required Measurement and Signalling support, Templates according to R3-071730," 3GPP Drafttsg-RAN WG3 Meeting #57bis; R3-071936, 3rd Generation Partnership Project (3GPP), Sophia Antipolis, France, XP050162723, pp. 2-4, (Oct. 3, 2007).

ZTE: "Generation of Neighbour Relations", 3GPP Draft; R3-080077, 3rd Generation Partnership Project (3GPP), Mobile Competence Centre; 650, Route Des Lucioles; F-06921 Sophia-Antipolis Cedex; France, vol. RAN WG3, No. Sorrento, Italy; Feb. 5, 2008, XP050163310 [retrieved on Feb. 5, 2008] p. 1, line 23-p. 3, line 3.

Tinnakornsrisuphap, P., "Automatic Configuration Support for 1x and HRPD Femto", Qualcomm, A20-20080616-004r0, pp. 1-15, Jun. 2008.

Telecom Italia, et al., "Way forward for handover to HeNB" 3GPP Draft; R2-084534, 3rd Generation Partnership Project (3GPP), Mobile Competence Centre ; 650, Route Des Lucioles ; F-06921 Sophia-Antipolis Cedex ; France, No. Jeju; Aug. 12, 2008.

\* cited by examiner

WIRELESS COMMUNICATION SYSTEMS WITH FEMTO NODES

CROSS REFERENCE TO RELATED APPLICATION(S)

The present application for patent claims priority to Provisional Application No. 61/081,006, entitled Air-Interface Enhancements for Femto Cells & Self Organizing Networks, filed Jul. 15, 2008, and assigned to the assignee hereof and hereby expressly incorporated by reference herein.

BACKGROUND

1. Field of the Invention

The present application relates generally to wireless communication, and more specifically to systems and methods to enable handoffs from macro nodes to femto nodes during connected calls.

2. Relevant Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In addition to mobile phone networks currently in place, a new class of small base stations has emerged, which may be installed in a user's home and provide indoor wireless coverage to mobile units using existing broadband Internet connections. Such personal miniature base stations are generally known as access point base stations, or, alternatively, Home Node B (HNB) or femto nodes. Typically, such miniature base stations are connected to the Internet and the mobile operator's network via a DSL router or a cable modem. Multiple femto nodes may be deployed by individual users in the coverage area of a traditional macro node. This type of deployment can complicate handing off a call from a macro node to a particular femto node. Adjusting the manner in which calls are handed off from macro nodes to femto nodes may be desirable.

SUMMARY OF THE INVENTION

In one embodiment, a method of communicating between an access terminal and a femto node is provided. The method comprises transmitting a known signal from a femto node to an access terminal, the known signal being configured to be compared to a reference signal by the access terminal. The method further comprises transmitting a first message from the femto node to the access terminal. The first message comprises an identifier that uniquely identifies the femto node. The method further comprises receiving a second message by the femto node. The second message comprises information facilitating a hand in of the access terminal from a macro node to the femto node. The femto node is identified as a hand in target based, at least in part, on the identifier. The method further comprises communicating with the access terminal in response to the second message.

In another embodiment, a wireless communication apparatus is provided. The apparatus comprises a transmitter configured to transmit a known signal to an access terminal, the known signal identifying the transmitter as a femto node transmitter, the known signal being configured to be compared to a reference signal by the access terminal. The transmitter is further configured to transmit an identifier to the access terminal, the identifier uniquely identifying the transmitter. The apparatus further comprises a receiver configured to receive a message, the message comprising information facilitating a hand in of the access terminal from a macro node to the transmitter and receiver. The transmitter and receiver are identified as a hand in target based, at least in part, on the identifier. The apparatus further comprises a processing circuit configured to establish a communication link between the transmitter and/or receiver and the access terminal in response to the message.

In a further embodiment, a computer program product is provided. The computer program product comprises a computer-readable medium. The computer readable medium comprises code for causing a computer to transmit a known signal from a femto node to an access terminal, the known signal being configured to be compared to a reference signal by the access terminal. The computer program product further comprises code for causing a computer to transmit a first message from the femto node to the access terminal, wherein the first message comprises an identifier that uniquely identifies the femto node. The computer program product further comprises code for causing a computer to receive a second message, by the femto node, the second message comprising information facilitating a hand in of the access terminal from a macro node to the femto node. The femto node is identified as a hand in target based, at least in part, on the identifier. The computer program product further comprises code for causing a computer to communicate with the access terminal in response to the second message.

In another embodiment, a wireless communication apparatus is provided. The wireless communication apparatus comprises means for transmitting a known signal to an access terminal, the known signal identifying the transmitting means as a femto node transmitting means, the known signal being configured to be compared to a reference signal by the access terminal, and for transmitting an identifier to the access terminal, the identifier uniquely identifying the transmitting means. The wireless communication apparatus further comprises means for receiving a message, the message comprising information facilitating a hand in of the access terminal from a macro node to the transmitting and receiving means. The transmitting and receiving means are identified as a hand in target based, at least in part, on the identifier. The wireless communication apparatus further comprises means for establishing a communication link between the transmitting and receiving means and the access terminal in response to the message.

In another embodiment, a wireless communication apparatus is provided. The apparatus comprises a receiver configured to receive a predetermined signal from a femto node. The receiver is further configured to receive a first message from the femto node, the first message comprising an identifier that uniquely identifies the femto node. The apparatus further comprises a processing circuit configured to determine signal strength of the received predetermined signal, based, at least in part, on comparing the received predetermined signal to a reference signal. The processing circuit is further configured to obtain the identifier from the first message. The apparatus further comprises a transmitter configured to transmit the identifier to a macro node. The femto node is identified as a hand in target based, at least in part, on the identifier. The receiver is further configured to receive a second message, the second message comprising information facilitating a hand in of the transmitter and receiver from the macro node to the femto node. The processing circuit is further configured to establish a communication link between the transmitter and/or receiver and the femto node in response to the second message.

DESCRIPTION OF THE PREFERRED EMBODIMENTS

Figure 1:
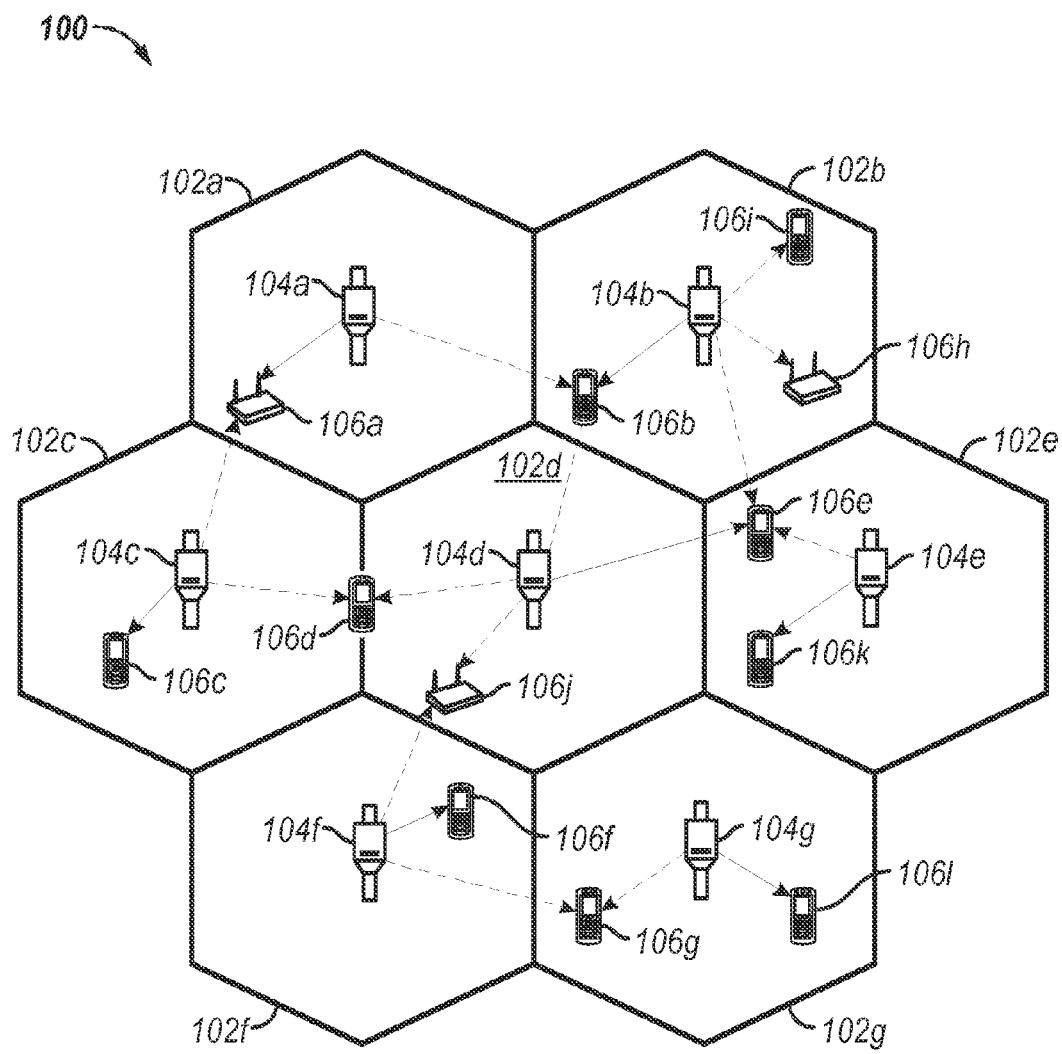
FIG. 1 illustrates an exemplary wireless communication network.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

FIG. 1 illustrates an exemplary wireless communication network 100. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104, such as, for example, nodes 104a-104g. Each node 104 may provide communication coverage to a corresponding cell 102. The nodes 104 may interact with a plurality of access terminals (ATs), such as, for example, ATs 106a-106l.

Each AT 106 may communicate with one or more nodes 104 on a forward link (FL) and/or a reverse link (RL) at a given moment. A FL is a communication link from a node to an AT. A RL is a communication link from an AT to a node. The nodes 104 may be interconnected, for example, by appropriate wired or wireless interfaces and may be able to communicate with each other. Accordingly, each AT 106 may communicate with another AT 106 through one or more nodes 104. For example, the AT 106j may communicate with the AT 106h as follows. The AT 106j may communicate with the node 104d. The node 104d may then communicate with the node 104b. The node 104b may then communicate with the AT 106h. Accordingly, a communication is established between the AT 106j and the AT 106h.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to a communications network, such as, for example the internet or a cellular network.

An AT 106 may be a wireless communication device (e.g., a mobile phone, router, personal computer, server, etc.) used by a user to send and receive voice or data over a communications network. An access terminal (AT) may also be referred to herein as a user equipment (UE), as a mobile station (MS), or as a terminal device. As shown, ATs 106a, 106h, and 106j comprise routers. ATs 106b-106g, 106i, 106k, and 106l comprise mobile phones. However, each of ATs 106a-106l may comprise any suitable communication device.

Figure 2:
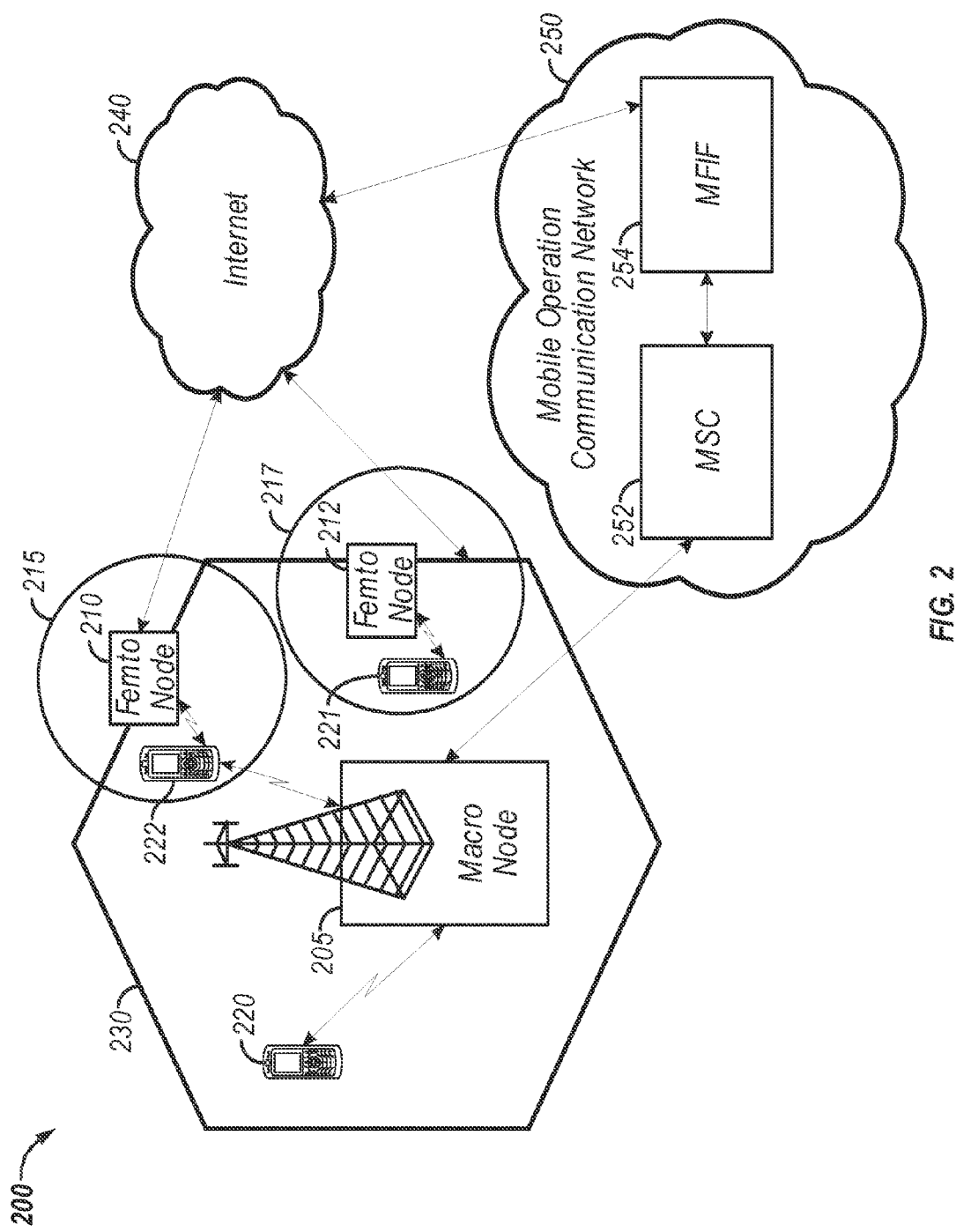
FIG. 2 illustrates the exemplary interoperations of two or more communication networks.

FIG. 2 illustrates exemplary interoperations of two or more communication networks. It may desirable for an AT 220 to transmit information to and receive information from another AT such as AT 221. FIG. 2 illustrates a manner in which the AT 220 may communicate with the AT 221. As shown in FIG. 2, the macro node 205 may provide communication coverage to access terminals within a macro area 230. For example, the AT 220 may generate and transmit a message to the macro node 205. The message may comprise information related to various types of communication (e.g., voice, data, multimedia services, etc.). The AT 220 may communicate with the macro node 205 via a wireless link.

The macro node 205 may also communicate with a mobile switching center (MSC), such as the MSC 252 operating in the communication network 250. For example, the macro node 205 may transmit the message received from the AT 220 to the MSC 252. Generally, the MSC 252 may facilitate communication between the AT 220 and the AT 221 by first receiving the message received from the AT 220 via the macro node 205. The MSC 252 may then transmit the message to a macro femto internetworking function (MFIF), such as the MFIF 254, for eventual transmission to the AT 221 via a femto node. The MFIF may also be referred to as a femto convergence server (FCS), MSC/MSCe, or femto switch. The macro node 205 and the MSC 252 may communicate via a wired link. For example, a direct wired link may comprise a fiber optic or Ethernet link. The macro node 205 and the MSC 252 may be co-located or deployed in different locations.

The MSC 252 may also communicate with the macro femto internetworking function (MFIF) 254. Generally, the MFIF 254 may facilitate communication between the 220 and the AT 221 by first receiving the message from the AT 220 via the macro node 205 and the MSC 252. The MFIF 254 may then route the message to a femto node for transmission to the AT 221. The MSC 252 and the MFIF 254 may communicate via a direct wired link as described above. The MSC 252 and the MFIF 254 may be co-located or may be deployed in different locations.

The MFIF 254 may also communicate with the Internet 240 (and/or another appropriate wide area network). Generally, the Internet 240 may facilitate communication between the AT 220 and the AT 221 by first receiving the message from the AT 220 via the macro node 205, the MSC 252, and the MFIF 254. The Internet 240 may then transmit the message to a femto node, such as the femto node 212 for transmission to the AT 221. The MFIF 254 may communicate with the Internet 240 via a wired or wireless link as described above.

The Internet 240 may also communicate with femto nodes, such as the femto nodes 210, 212. The femto node 212 may facilitate communication between the AT 220 and the AT 221 by providing communication coverage for the AT 220 within a femto area 217. For example, the femto node 212 may receive the message originating at the AT 220 via the macro node 205, the MSC 252, the MFIF 254, and the Internet 240. The femto node 212 may then transmit the message to the AT 221 in the femto area 217. The femto node 212 may communicate with the AT 221 via a wireless link.

As described above, the macro node 205, the MSC 252, the MFIF 254, the Internet 240, and the femto node 212 may interoperate to form a communication link between the AT 220 and the AT 221. For example, the AT 220 may transmit generate and transmit the message to the macro node 205. The macro node 205 may then transmit the message to the MSC 252. The MSC 252 may subsequently transmit the message to the MFIF 254. The MFIF 254 may then transmit the message to the Internet 240. The Internet 240 may then transmit the message to the femto node 212. The femto node 212 may then transmit the message to the AT 221. Similarly, the reverse path may be followed from the AT 221 to the AT 220.

In one embodiment, the femto nodes 210, 212 may be deployed by individual consumers and placed in homes, apartment buildings, office buildings, and the like. The femto nodes 210, 212 may communicate with the ATs in a predetermined range (e.g., 100 m) of the femto nodes 210, 212 utilizing a predetermined cellular transmission band. In one embodiment, the femto nodes 210, 212 may communicate with the Internet 240 by way of an Internet Protocol (IP) connection, such as a digital subscriber line (DSL, e.g., including asymmetric DSL (ADSL), high data rate DSL (HDSL), very high speed DSL (VDSL), etc.), a TV cable carrying Internet Protocol (IP) traffic, a broadband over power line (BPL) connection, or other link. In another embodiment, the femto nodes 210, 212 may communicate with the MFIF 254 via a direct link.

As described above, multiple femto nodes 210, 212 may be deployed within the macro area 230. The deployment of multiple femto nodes 210, 212, in the macro area 230 may make it desirable to improve the process of handing off a call from the macro node 205 to the femto node 210. For example, the AT 222 may initiate a call by communicating with the macro node 205. However, as the AT 222 moves during the call, it may be advantageous for the macro node 205 to hand off the call to femto node 210. In one example, the femto node 210 may be located at the edge of the macro area 230 where the coverage provided by the macro node 205 may begin to deteriorate. However, in the same area, the coverage provided by the femto node 210 in femto area 215 may be strong. Accordingly, it may be desirable for the macro node 205 to hand in the AT 222 to the femto node 210. In addition to alleviating deteriorating coverage, it may be desirable for the macro node 205 to hand in to the femto node 210 for other reasons. For example, the macro node 205 may provide communication coverage to a large number of ATs. It may be beneficial to overall system performance to offload some of the AT communication traffic from the macro node 205 by handing in ATs to femto nodes. In either case, as the femto node 212 and other femto nodes may be present, the process of handing in from the macro node 205 may require identifying which of the femto nodes 210, 212 is the intended hand in target. As additional femto nodes are deployed within the macro area 230, it may be desirable to improve the manner in which femto nodes are identified during the hand in process.

In one embodiment, the femto node 210 and/or the macro node 205 may broadcast a pilot signal. A pilot signal may comprise a known signal for determining the strength of signals received from the femto node 210 and/or the macro node 205 at an AT (e.g., AT 222). The actual received pilot signal may be compared to a reference signal at the AT 222 to determine signal quality. For example, the reference signal could be a wave form or sequence for use in comparing the actual received pilot signal. The strength of signals received from the femto node 210 and/or the macro node 205 may comprise an $E_{cp}/I_o$ ratio (energy of the pilot signal to energy of interfering signals ratio) or a signal-to-noise ratio. The pilot signal may also comprise an offset pseudo noise (PN) short code. The offset PN short code may comprise a code or sequence of numbers that identifies the node and/or the node type (e.g., femto node, macro node, pico node). The offset PN short code may comprise a PN short code with a PN offset applied. The PN offset may indicate the delay from the true network synchronization time applied to a PN short code. In one embodiment, all of the nodes may use the same PN short code. However, a different PN offset may be applied to the PN short code for different nodes. Thus, the PN offset directly correlates to the offset PN short code and the terms "PN offset" and "offset PN short code" may be used interchangeably herein. In one embodiment, the PN offset may be used to identify the type of node (e.g., femto node, macro node, pico node) transmitting the pilot signal. For example, a particular set of PN offsets may be reserved for identifying femto nodes. However, the number of PN offsets available for use may be smaller than the number of femto nodes within the macro area 230. For example, 512 unique PN offsets may be set aside for use by femto nodes. However, there may be more than 512 femto nodes deployed within the macro area 230. As a result, multiple femto nodes within the macro area 230 may use the same PN offset.

In one example, an AT, such as the AT 222, in communication with a macro node, such as the macro node 205, may receive a pilot signal from a femto node, such as the femto node 210. The AT 222 may be configured to determine the PN offset and signal strength from the pilot signal and to report these values to the macro node 205. Based on the received signal strength and the PN offset, the macro node 205 may determine that a hand in to the femto node 210 should occur. For example, the macro node 205 may determine that the strength of the signal between the macro node 205 and the AT 222, the noise level, the signal to noise ratio, the maximum data rate, the throughput, the error rate, and other handoff criteria justify handing in the AT 222 to the femto node 210. However, because the PN offset used by the femto node 210 may not be unique, the information sent from the AT 222 to the macro node 205 may be insufficient to uniquely identify the femto node 210.

While the foregoing example has been described in connection with PN offsets, such examples are used for the purpose of explanation and should not be interpreted as limiting. The present systems and methods are equally applicable to other communication standards such as Universal Mobile Telecommunication System (UMTS) and Long Term Evolution (LTE). For example, in a UMTS system, a scrambling code (SC) used by a femto node may serve as an identifier which may be insufficient to uniquely identify the femto node. Similarly, in an LTE system, a physical cell identifier used by a femto node may serve as an identifier which may be insufficient to uniquely identify the femto node. In each case, additional information may be needed to uniquely identify femto nodes.

In order to facilitate handing in to the femto node 210 from the macro node 205, information besides the PN offset of the femto node 210 may be used to uniquely identify the femto node 210. In one example, the femto node 210 may generate and transmit a femto node or access point identification message (APIDM). The APIDM message may be transmitted separately from the pilot signal, for example, in a different channel. The femto node 210 may include in the APIDM message an MSC identifier (MSC ID). An MSC ID may be assigned to a femto node to indicate one of a plurality of MFIFs that is associated with the femto node. For example, the MSC ID may comprise a value used by the MSC 252 to determine that the MFIF 254 is associated with the femto node 210, provided that the femto node 210 is assigned an MSC ID identifying the MFIF 254. The MSC 252 may maintain a data structure, e.g., a list or table, which relates MSC ID values to particular MFIFs. Thus, when the MSC 252 receives an MSC ID, the MSC 252 may determine that information should be sent to the MFIF associated with that MSC ID. The APIDM message may also comprise a CELL identifier (CELL ID). A CELL ID may be assigned to a femto node to uniquely identify the femto node from amongst a plurality of femto nodes associated with a particular MFIF. For example, the CELL ID may comprise a value used by the MFIF 254 to uniquely identify the femto node 210 as between the femto nodes 210, 212 and other femto nodes (not shown) associated with the MFIF 254. The MFIF 254 may maintain a data structure, e.g., a list or table, which relates CELL ID values to particular femto nodes. Thus, when the MFIF 254 receives a CELL ID, the MFIF 254 may determine that information should be sent to the femto node associated with the CELL ID.

As described in detail below, the use of an APIDM message including both an MSC ID and a CELL ID may be sufficient to identify a hand in target, e.g., the femto node 210. For example, the AT 222 or the macro node 205 may determine that a hand in from the macro node 205 to the femto node 210 may be desirable. However, the femto node 210 may use the same PN offset as the femto node 212. Thus, the AT 222 may not be able to identify the femto node 210 as its target by providing the PN offset to the macro node 205. In this example, the femto node 210 may be configured to include identifying information such an MSC ID and a CELL ID in the APIDM message. The AT 222 may receive this APIDM message and extract the MSC ID and CELL ID. The AT 222 may then transmit the MSC ID and CELL ID to the macro node 205. In one embodiment, the AT 222 may be configured to transmit the MSC ID and CELL ID to the macro node 205 in response to receiving the APIDM. Alternatively, the AT 222 may be configured to conditionally transmit the MSC ID and CELL ID. For example, as described above, the AT 222 may receive a pilot signal from the femto node 210 in addition to the APIDM. The AT 222 may be configured to transmit the MSC ID and CELL ID to the macro node 205 based upon the properties of the received pilot signal. For example, if the signal strength of the pilot signal is too low or otherwise indicates that a hand in is undesirable, the AT 222 may be configured to not transmit the MSC ID and CELL ID. Alternatively, if the PN offset indicates that the femto node 210 belongs to a network with which the AT 222 is not permitted to communicate, the AT 222 may be configured to not transmit the MSC ID and CELL ID to the macro node 205. However, if the AT 222 determines that a hand off is desirable and permitted, the AT 222 may be configured to transmit the MSC ID and the CELL ID to the macro node 205. In another embodiment, the AT 222 may transmit to the macro node 205 an indication of a detection of the femto node 210. Based on the detection indication, the macro node 205 may determine that a hand in to the femto node 210 is desirable. The macro node 205 may then respond to the detection indication by requesting information about the femto node 210 from the AT 222. The AT 222 may then transmit the identifying information including, for example, the MSC ID and the CELL ID to the macro node 205. Once the macro node 205 has determined that a hand in is desirable and has received the MSC ID and CELL ID, the macro node 205 may then transmit the MSC ID and CELL ID to the MSC 252. The MSC 252 may utilize the MSC ID to determine that the CELL ID should be passed to the MFIF 254. The MSC 252 may then send the CELL ID to the MFIF 254. The MFIF 254 may utilize the CELL ID to identify femto node 210 as the target of the desired hand in. Once the femto node 210 is identified as the hand in target, the hand in process may proceed. For example, a hand in request originating from the macro node 205 may be passed to the MFIF 254 via the MSC 252. The MFIF 254 may transmit the hand in request to the femto node 210. The femto node 210 may accept the request and send an acknowledgement to the MFIF 254. The MFIF 254 may forward the acknowledgement to the macro node 205 via the MSC 252. The macro node 205 may then instruct the AT 222 to hand in to the femto node 210. In another example, the macro node 205 may transmit the generated handoff request or other handoff instructions directly to the femto node 210 via a wireless link (not shown) or a wired link such as the Internet 240.

While the foregoing example has been described in connection with an MSC ID and a CELL ID, such examples are used for the purpose of explanation and should not be interpreted as limiting. Using an MSC ID and CELL ID may be advantageous for interfacing with existing network infrastructure components e.g. ATs, macro nodes, MSCs, and MFIFs. In addition, other types of identifiers may also be used. These identifiers may include an Access Point Identifier, a Femto Equipment Identifier, an Ethernet Media Access Control address, a Sector Identifier, a Base Station Identifier, an Internet Protocol address, or other type of identifier that may be used to uniquely identify the femto node 210.

Figure 3:
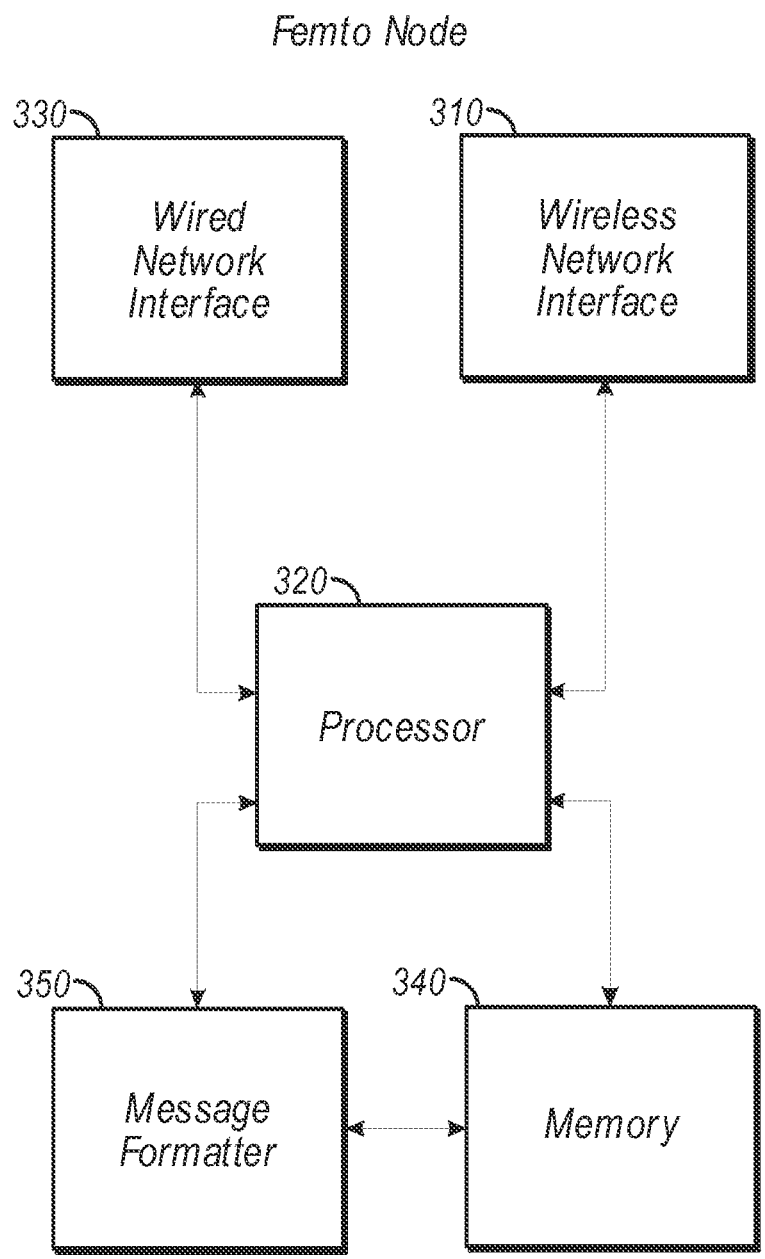
FIG. 3 is a functional block diagram of an exemplary femto node shown in FIG. 2.

FIG. 3 is a functional block diagram of an exemplary femto node 210 shown in FIG. 2. As discussed above with respect to FIG. 2, the femto node 210 may facilitate a hand in from the macro node 205 to the femto node 210 by providing the AT 222 with an APIDM message. The femto node 210 may comprise a wireless network interface 310 configured to transmit an outbound wireless message, such as the APIDM message, to the AT 222. The wireless network interface 310 may also receive an inbound wireless message from the AT 222. Wireless network interface 310 may be coupled to the processor 320. The processor 320 may be configured to process the APIDM message and the inbound and outbound wireless messages coming from or going to the AT 222 via the wireless network interface 310. The processor 320 may also be configured to control other components of the femto node 210. The processor 320 may be further coupled to a wired network interface 330. The wired network interface 330 may be configured to pass an outbound wired message to, and receive an inbound wired message from, the Internet 240. The wired network interface 330 may pass the inbound wired message to the processor 320 for processing. The processor 320 may process and pass the wired outbound message to the wired network interface 310 for transmission.

The processor 320 may further be coupled, via one or more buses, to a memory 340. The processor 320 may read information from or write information to the memory 340. For example, the memory 340 may be configured to store inbound our outbound messages before, during, or after processing. In particular, the memory 340 may be configured to store the APIDM message. The processor 320 may also be coupled to a message formatter 350. The message formatter 350 may be configured to generate the APIDM message used to facilitate a hand in from the macro node 205 to the femto node 210. As described above, the presence of a plurality of femto nodes 210, 212 may rely on the APIDM message in the process of handing in the AT 220 from the macro node 205 to the femto node 210. As described above with respect to FIG. 2, the APIDM message may comprise an MSC ID and a CELL ID. The message formatter 350 may pass the generated APIDM message to processor 320 for any additional processing before the APIDM message is transmitted via the wireless network interface 310 to AT 222. The message formatter 350 may also be coupled directly to the memory 340 in order to store or retrieve information for use in message formatting. In one embodiment, the processed, formatted APIDM message may be transmitted or broadcast periodically by the wireless network interface 310 and received by an AT, such as, for example, the AT 222.

The wireless network interface 310 may comprise an antenna and a transceiver. The transceiver may be configured to modulate/demodulate the wireless outbound/inbound messages going to or coming from AT 222 respectively. The wireless outbound/inbound messages may be transmitted/received via the antenna. The antenna may be configured to send and/or receive the outbound/inbound wireless messages to/from the AT 222 over one or more channels. The outbound/inbound messages may comprise voice and/or data-only information (collectively referred to herein as "data"). The wireless network interface 310 may demodulate the data received. The wireless network interface 310 may modulate data to be sent from the femto node 210 via the wireless network interface 310. The processor 320 may provide data to be transmitted.

The wired network interface 330 may comprise a modem. The modem may be configured to modulate/demodulate the outbound/inbound wired messages going to or coming from the Internet 240. The wired network interface 330 may demodulate data received. The demodulated data may be transmitted to the processor 320. The wired network interface 330 may modulate data to be sent from the femto node 210 via the wired network interface 330. The processor 320 may provide data to be transmitted.

The memory 340 may comprise processor cache, including a multi-level hierarchical cache in which different levels have different capacities and access speeds. The memory 340 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives Although described separately, it is to be appreciated that functional blocks described with respect to the femto node 210 need not be separate structural elements. For example, the processor 320 and the memory 340 may be embodied in a single chip. The processor 320 may additionally, or in the alternative, contain memory, such as processor registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the femto node 210, such as processor 320 and message formatter 350, may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the femto node 210 may also be implemented as a combination of computing devices, e.g., a combination of a DSP and a microprocessor, a plurality of microprocessors, one or more microprocessors in conjunction with a DSP communication, or any other such configuration.

Figure 4:
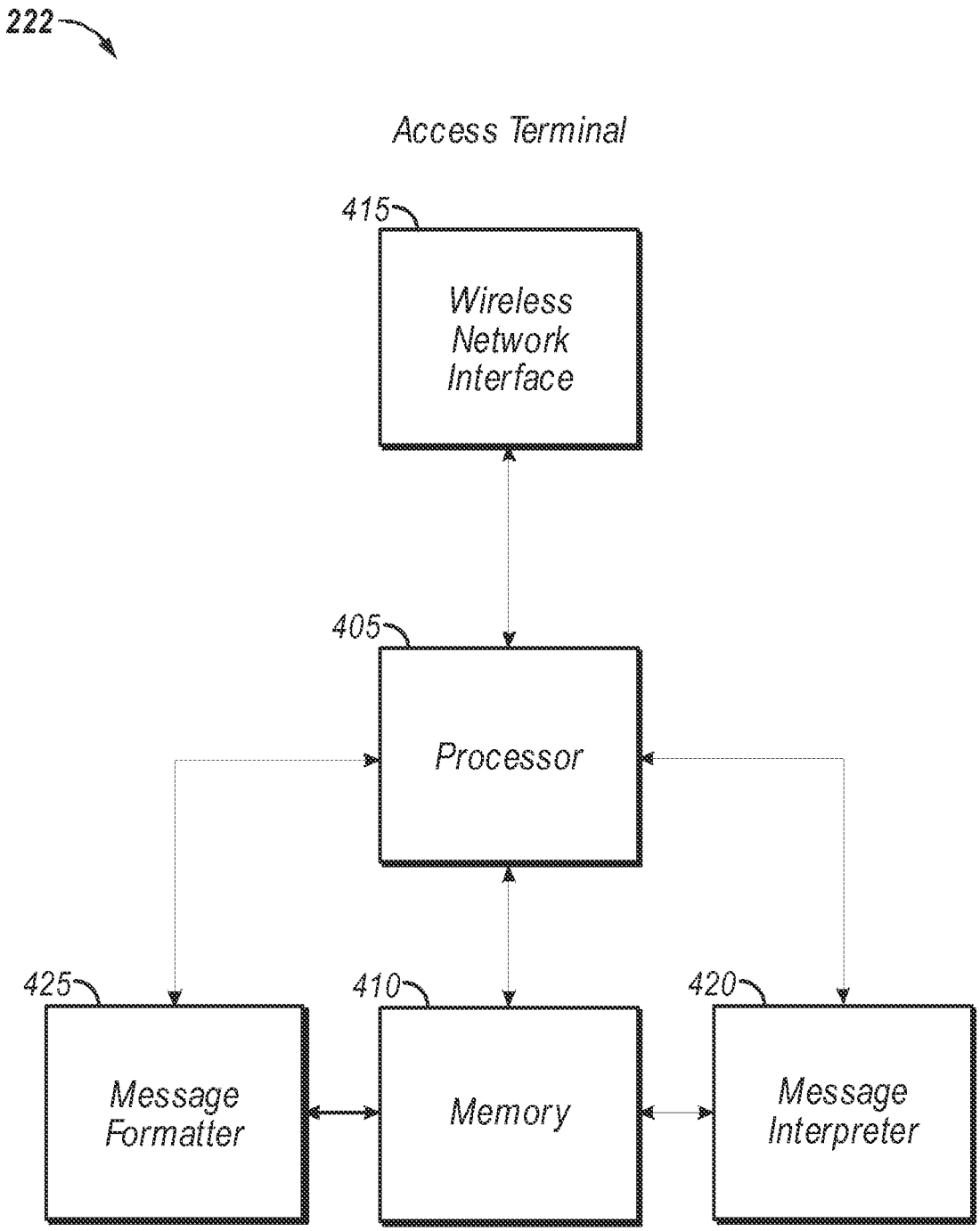
FIG. 4 is a functional block diagram of an exemplary access terminal shown in FIG. 2.

FIG. 4 is a functional block diagram of an exemplary access terminal 222 shown in FIG. 2. As discussed above, the AT 222 may be a mobile phone. The AT 222 may be used to facilitate a hand in from the macro node 205 to the femto node 210 by receiving the APIDM message from the femto node 210 and passing the identifying information in the APIDM message to the macro node 205.

The AT 222 may comprise a processor 405 configured to process information for storage, transmission, and/or for the control of other components of the AT 222. The processor 405 may further be coupled to a memory 410. The processor may read information from or write information to the memory 410. The memory 410 may be configured to store messages before, during or after processing. In particular, the memory 410 may be configured to store the APIDM message and the accompanying identifying information. The processor 405 may also be coupled to a wireless network interface 415. The wireless network interface 415 may be configured to receive and inbound wireless message from, and transmit an outbound wireless message to the femto node 210 or the macro node 205. The inbound wireless message may be passed to the processor 405 for processing. The processor 405 may process the outbound wireless message passing the outbound wireless message to the wireless network interface 415 for transmission.

The processor 405 may also be coupled to a message interpreter 420. The inbound wireless message received at the wireless network interface 415 from the femto node 210 may be passed to the processor 405 and passed by the processor 405 to the message interpreter 420 for additional processing. For example, the message interpreter 420 may be configured to extract the MSC ID and CELL ID from the APIDM message for use in identifying the AT 222 as a hand in target as described above. The message interpreter 420 may pass the MSC ID and CELL ID values and other information to the processor 405 for additional processing. The message interpreter 420 may also interpret information in a request message received from the macro node 205. For example, as described above, the macro node 205 may send the request message to the AT 222 requesting additional information about the femto node 210. In particular, the macro node 205 may request the MSC ID and CELL ID. The message interpreter 420 may process this request message and provide the processor 405 with information for responding to the request message. The message interpreter 420 may also be coupled to the memory 410 to store or retrieve information for use in message interpreting.

The processor 405 may also be coupled to a message formatter 425. The message formatter 425 may generate or format the outbound wireless message to be transmitted by the wireless network interface 415. For example, the message formatter 425 may be configured to include the MSC ID and a CELL ID associated with femto node 210 in the outbound wireless message to the macro node 205. As described above, the message formatter 425 may be configured to include the MSC ID and CELL ID in the outbound wireless message responsive to receiving APIDM message from the femto node 210. Alternatively, the message formatter 425 may be configured to include the MSC ID and CELL ID in the outbound wireless message responsive to receiving the request message from the macro node 205. In either case, the wireless outbound message may be passed by the message formatter 425 to the processor 405 for transmission by the wireless network interface 415 to the macro node 205. The macro node 205 may then use the information in the outbound wireless message, including the MSC ID and CELL ID, to facilitate identification of the hand in target as described above. The message formatter 425 may be coupled directly to the memory 410 in order to store or retrieve information for use in message formatting.

The wireless network interface 415 may comprise an antenna and a transceiver. The transceiver may be configured to modulate/demodulate the outbound/inbound wireless messages going to or coming from femto node 210 and the macro node 205. The outbound/inbound wireless messages may be transmitted/received via the antenna. The antenna may be configured to communicate with the femto node 210 and macro node 205 over one or more channels. The outbound/inbound wireless message may comprise voice and/or data-only information (collectively referred to herein as "data"). The wireless network interface 415 may demodulate the data received. The wireless network interface 415 may modulate data to be sent from the AT 222 via the wireless network interface 415. The processor 405 may provide data to be transmitted.

The memory 410 may comprise processor cache, including a multi-level hierarchical cache in which different levels have different capacities and access speeds. The memory 410 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives Although described separately, it is to be appreciated that functional blocks described with respect to the access terminal 222 need not be separate structural elements. For example, the processor 405 and the memory 410 may be embodied in a single chip. The processor 405 may additionally, or in the alternative, contain memory, such as processor registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the AT 222, such as processor 410, message interpreter 420, and message formatter 425 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the AT 222 may also be implemented as a combination of computing devices, e.g., a combination of a DSP and a microprocessor, a plurality of microprocessors, one or more microprocessors in conjunction with a DSP communication, or any other such configuration.

Figure 5:
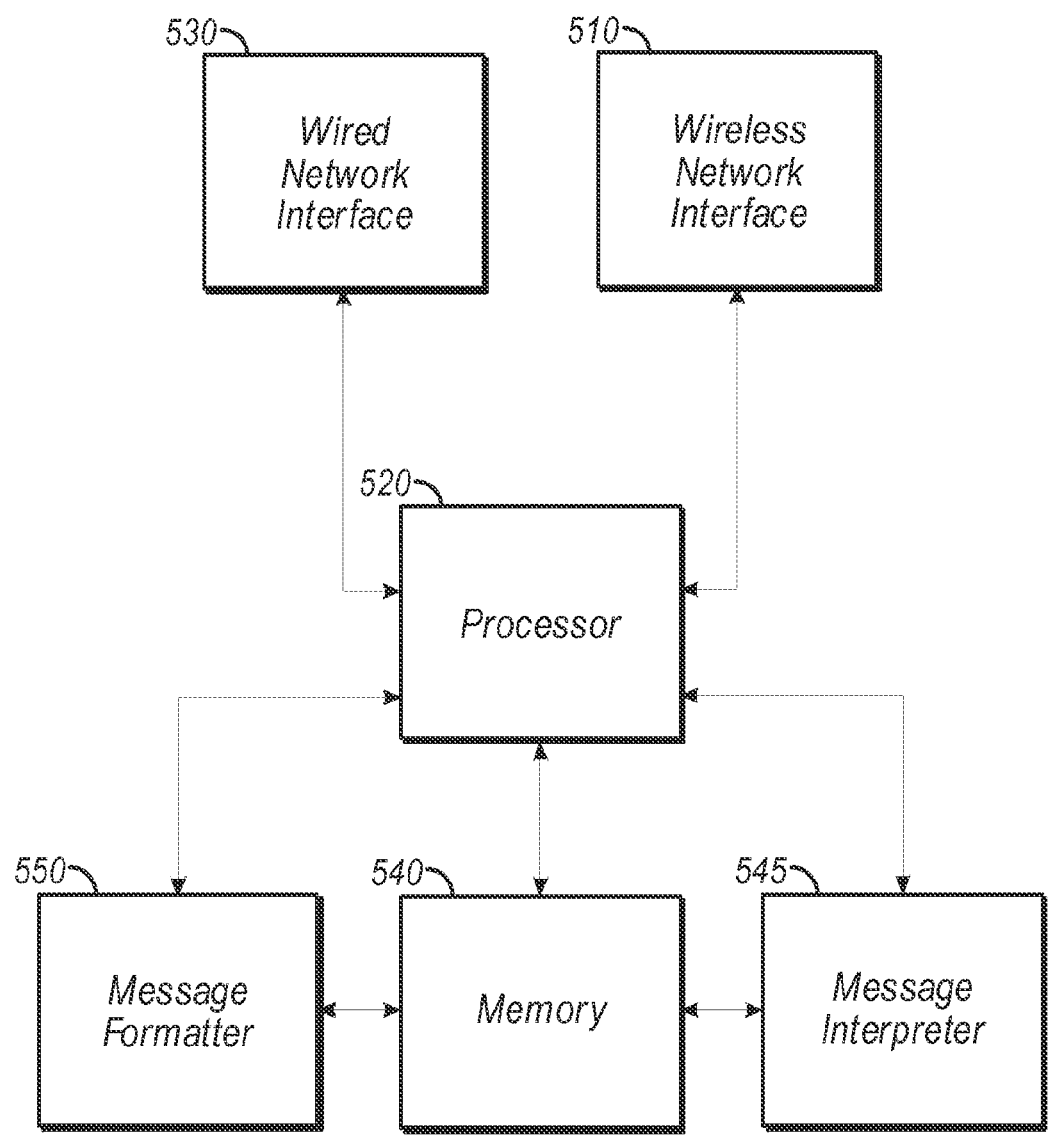
FIG. 5 is a functional block diagram of an exemplary macro node shown in FIG. 2.

FIG. 5 is a functional block diagram of an exemplary macro node 205 shown in FIG. 2. As discussed above with respect to FIG. 2, the macro node 205 may be a base station. The macro node 205 may also facilitate a hand in from the macro node 205 to the femto node 210 by receiving identifying information from the AT 222 and transmitting the identifying information to the MSC 252. The macro node 205 may comprise a wireless network interface 510 configured to receive an inbound wireless message from and transmit an outbound wireless message to the AT 222. Wireless network interface 510 may be coupled to the processor 520. The processor 520 may be configured to process the inbound and outbound wireless message coming from or going to the AT 222 via the wireless network interface 510. The processor 520 may also be configured to control other components of the macro node 205. The processor 520 may be further coupled to a wired network interface 530. The wired network interface 530 may be configured to receive an inbound wired message from and to transmit an outbound wired message to the MSC 252. The wired network interface 530 may receive an inbound wired message and pass the inbound wired message to the processor 520 for processing. The processor 520 may process an outbound wired message and pass the outbound wired message to the wired network interface 530 for transmission to the MSC 252.

The processor 520 may further be coupled, via one or more buses, to a memory 540. The processor 520 may read information from or write information to the memory 540. The memory 540 may be configured to store information for use in processing the inbound or outbound, wired or wireless message. The memory 540 may also be configured to store identifying information such as the MSC ID and CELL ID. The processor 520 may also be coupled to a message interpreter 545. The processor may pass the inbound wired and wireless message to the message interpreter 545 for processing. The message interpreter 545 may be configured to extract information from the inbound wireless message received at the wireless network interface 510. For example, the inbound wireless message received from the AT 222 may comprise identifying information such as MSC ID and a CELL ID as described above. The message interpreter 545 may extract the MSC ID and CELL ID values from the inbound wireless message provided by AT 222. The message interpreter 545 may pass this identifying information to the processor 520 for additional processing. In another example, the inbound wireless message from the AT 220 may comprise an indication that the AT 220 has detected the femto node 210. The message interpreter 545 may be configured to process the inbound wireless message and to provide the processor 520 with information for responding to the inbound wireless message by requesting additional information. This additional information may comprise the MSC ID and CELL ID of the femto node 210. The message interpreter 545 may also be coupled directly to the memory 540 in order to store or retrieve information for use in message interpretation.

The processor 520 may also be coupled to a message formatter 550. The message formatter 550 may be configured to generate the outbound wired or wireless message. The message formatter 550 may be further configured to pass the generated outbound wired or wireless message to the processor 520. The processor 520 may pass the outbound wired or wireless message to the wired network interface 530 or the wireless network interface 510 for transmission. The wired network interface 530 may transmit the outbound wired message to the MSC 252. As described above, the outbound wired message may comprise the MSC ID and the CELL ID for the femto node 210. The message formatter 550 may pass the outbound wireless message to the processor 520. The processor 520 may pass the outbound wireless message to the wireless network interface 510 for transmission to the AT 222. As described the outbound wireless message may comprise a request for identifying information of the femto node 210. The message formatter 550 may also be coupled directly to the memory 540 in order to store or retrieve information for use in message formatting.

The wireless network interface 510 may comprise an antenna and a transceiver. The transceiver may be configured to modulate/demodulate the outbound/inbound wireless messages going to or coming from the AT 222. The inbound/outbound wireless messages may be transmitted/received via the antenna. The antenna may be configured to send and/or receive the outbound/inbound wireless messages from the macro node 205 over one or more channels. The outbound/inbound wireless messages may comprise voice and/or data-only information (collectively referred to herein as "data"). The wireless network interface 510 may demodulate the data received. The wireless network interface 510 may modulate data to be sent from the macro node 205 via the wireless network interface 510. The processor 520 may provide data to be transmitted.

The wired network interface 530 may comprise a modem. The modem may be configured to modulate/demodulate the outbound/inbound wired message going to or coming from the MSC 252. The wired network interface 530 may demodulate the data received according to one or more wired standards using methods known in the art. The demodulated data may be transmitted to the processor 520. The wired network interface 530 may modulate data to be sent from the macro node 510 via the wired network interface 530 according to one or more wired standards using methods known in the art. The processor 520 may provide data to be transmitted.

The memory 540 may comprise processor cache, including a multi-level hierarchical cache in which different levels have different capacities and access speeds. The memory 540 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives Although described separately, it is to be appreciated that functional blocks described with respect to the macro node 205 need not be separate structural elements. For example, the processor 520 and the memory 540 may be embodied in a single chip. The processor 520 may additionally, or in the alternative, contain memory, such as processor registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the macro node 205, such as processor 520, message interpreter 545, and message formatter 550, may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the macro node 205 may also be implemented as a combination of computing devices, e.g., a combination of a DSP and a microprocessor, a plurality of microprocessors, one or more microprocessors in conjunction with a DSP communication, or any other such configuration.

Figure 6:
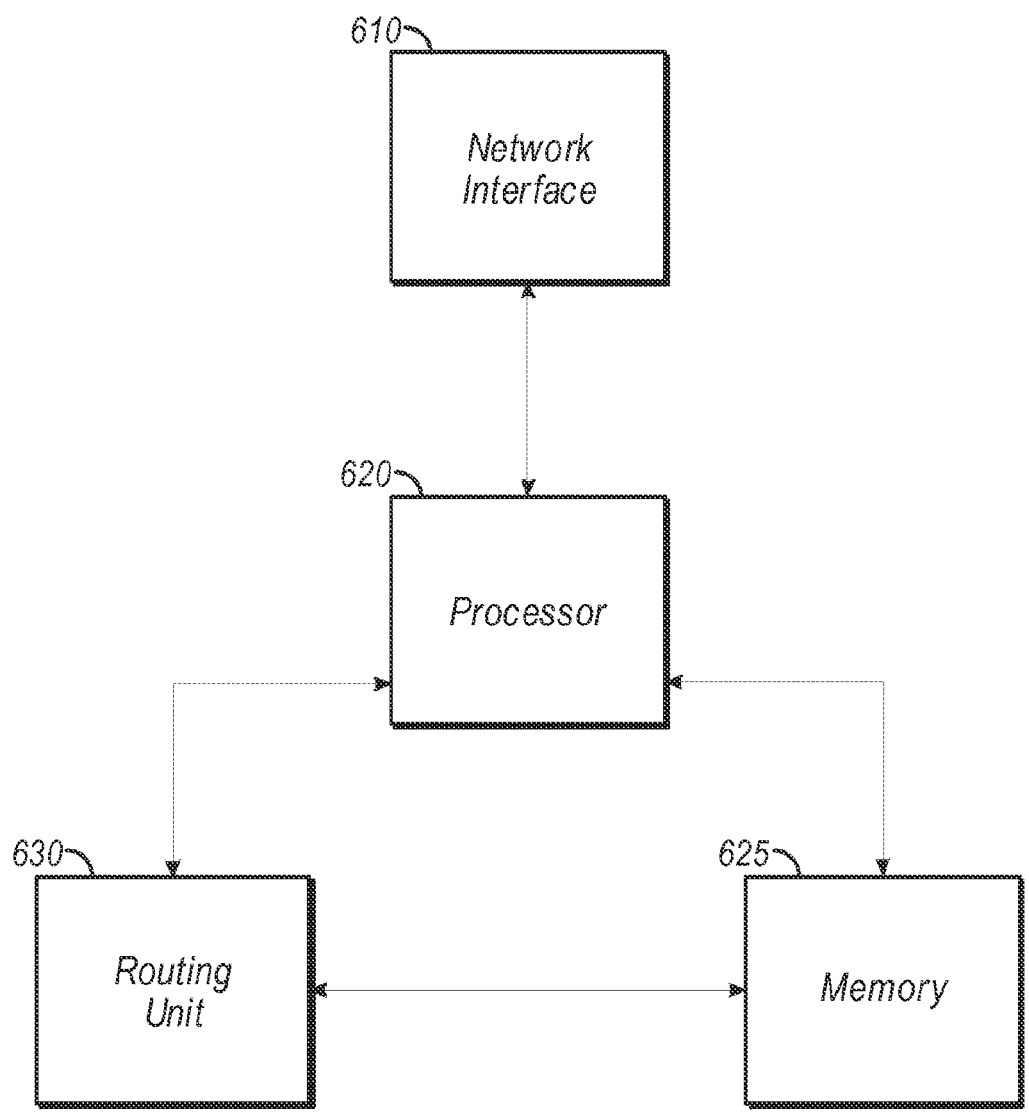
FIG. 6 is a functional block diagram of an exemplary mobile switching center shown in FIG. 2.

FIG. 6 is a functional block diagram of an exemplary mobile switching center (MSC) 252 shown in FIG. 2. As described above with respect to FIG. 2, the MSC 252 may operate as a router configured to route messages between the macro node 205 and the MFIF 254. In addition, the MSC 252 may be configured to help identify hand in targets such as the femto node 210 by identifying the MFIF associated with the femto node 210 based on an MSC ID. The MSC 252 may comprise a network interface 610 configured to receive an inbound message from and to transmit an outbound message to the macro node 205 or the MFIF 254. The network interface 610 may be coupled to a processor 620. The processor 620 may be configured to process the inbound message received by and the outbound message transmitted by the network interface 610. The processor 620 may further be coupled, via one or more buses, to a memory 625. The processor 620 may read information from or write information to the memory 625. The memory 625 may be configured to store the inbound and outbound message before, during, or after processing. In particular, the memory 625 may be configured to store the MSC ID and CELL ID described above.

The processor 620 may be further coupled to a routing unit 630. The processor 620 may pass the inbound message to the routing unit 630 for additional processing. The routing unit 630 may analyze the inbound message to determine one or more destinations based, at least in part on the content of the inbound message. For example, the inbound message may contain the MSC ID and the CELL ID of the femto node 210. The routing unit 630 may analyze the MSC ID and determine that the femto node 210 is associated with the MFIF 254. The routing unit 630 may be directly coupled to the memory 625 to facilitate making routing decisions. For example, the memory 625 may store a data structure, e.g., a list or table, containing information associating MSC ID values with addresses or other identifiers for MFIFs. The routing unit 630 may be configured to look up the identifiers for an MFIF in the memory 625 using the MSC ID. The routing unit 630 may also be configured to provide information to the processor 620 such as an address or other identifier for the MFIF 254 to which the CELL ID and other information should be sent. The processor 620 may be configured to use this information from the routing unit 630 to generate the outbound message. The processor 620 may pass the outbound message to the network interface 610 for transmission to the MFIF 254.

The network interface 610 may comprise a modem. The modem may be configured to modulate/demodulate the outbound/inbound messages. The network interface 610 may demodulate the data received according. The demodulated data may be transmitted to the processor 620. The network interface 610 may modulate data to be sent from the MSC 252. Data to be sent may be received from the processor 620.

The memory 625 may comprise processor cache, including a multi-level hierarchical cache in which different levels have different capacities and access speeds. The memory 625 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives Although described separately, it is to be appreciated that functional blocks described with respect to the MSC 252 need not be separate structural elements. For example, the processor 620 and the memory 625 may be embodied in a single chip. The processor 620 may additionally, or in the alternative, contain memory, such as processor registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the MSC 252, such as processor 620 and routing unit 630 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the MSC 252 may also be implemented as a combination of computing devices, e.g., a combination of a DSP and a microprocessor, a plurality of microprocessors, one or more microprocessors in conjunction with a DSP communication, or any other such configuration.

Figure 7:
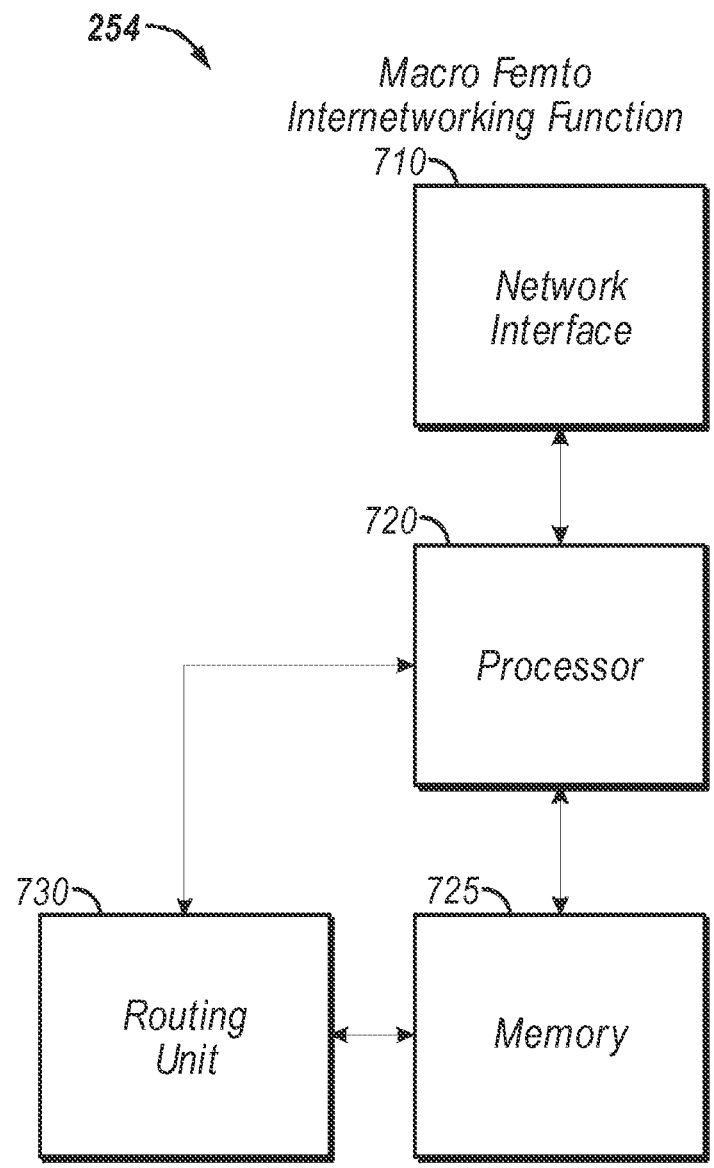
FIG. 7 is a functional block diagram of an exemplary macro femto internetworking function shown in FIG. 2.

FIG. 7 is a functional block diagram of an exemplary macro femto internetworking function shown in FIG. 2. As described above with respect to FIG. 2, the MFIF 254 operate as a femto switch configured to route messages between the MSC 252 and the femto node 210 via Internet 240. In addition, the MFIF 254 may be configured to help identify hand in targets such as the femto node 210 based on a CELL ID. The MFIF 254 may comprise a network interface 710 configured to receive an inbound message from and to transmit an outbound message to the MFIF 254 or the femto node 210 via the Internet 240. The network interface 710 may be coupled to a processor 720. The processor 720 may be configured to process the inbound and outbound messages. The processor 720 may further be coupled, via one or more buses, to a memory 725. The processor 720 may read information from or write information to the memory 725. The memory 725 may be configured to store the inbound and outbound messages before, during, or after processing. In particular, the memory 725 may be configured to store the CELL ID described above.

The processor 720 may be further coupled to a routing unit 730. The processor 720 may pass the inbound message to the routing unit 730 for additional processing. The routing unit 730 may analyze the inbound message to determine one or more destinations based, at least in part on the content of the inbound message. For example, the inbound message may comprise a CELL ID. The routing unit 730 may analyze the CELL ID and determine that the femto node is associated with the CELL ID. The routing unit 730 may be directly coupled to the memory 725 to facilitate making routing decisions. For example, the memory 725 may store a data structure, e.g., a list or table, containing information associating CELL ID values with addresses or other identifiers for femto nodes. The routing unit 730 may be configured to look up the identifiers for a femto node in the memory 725 using the CELL ID. The routing unit 730 may be configured to provide information to the processor 720 such as an address or other identifier for the femto node that is the hand in target. The processor 720 may be configured to use this information from the routing unit 730 to generate the outbound message. The processor 720 may pass the outbound message to the network interface 710 for transmission to the Internet 240 or to the MSC 252.

The network interface 710 may comprise a modem. The modem may be configured to modulate/demodulate the outbound/inbound messages going to or coming from the MFIF 254. The network interface 710 may demodulate the data received. The demodulated data may be transmitted to the processor 720. The network interface 710 may modulate data to be sent from the MSC 252. Data to be sent may be received from the processor 720.

The memory 725 may comprise processor cache, including a multi-level hierarchical cache in which different levels have different capacities and access speeds. The memory 725 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives Although described separately, it is to be appreciated that functional blocks described with respect to the MFIF 254 need not be separate structural elements. For example, the processor 720 and the memory 725 may be embodied in a single chip. The processor 720 may additionally, or in the alternative, contain memory, such as processor registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the MFIF 254, such as processor 720 and routing unit 730 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the MFIF 254 may also be implemented as a combination of computing devices, e.g., a combination of a DSP and a microprocessor, a plurality of microprocessors, one or more microprocessors in conjunction with a DSP communication, or any other such configuration.

Figure 8:
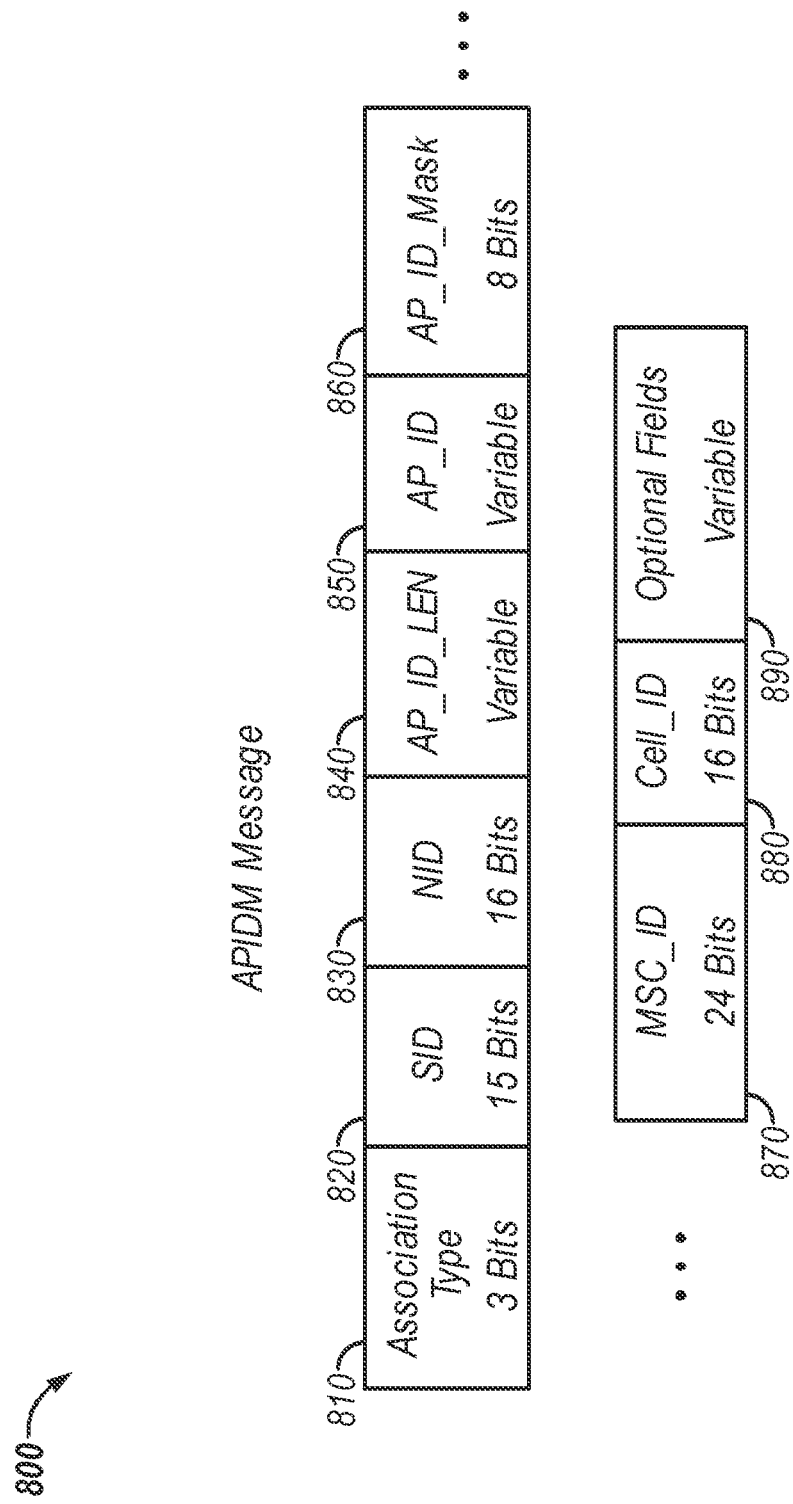
FIG. 8 illustrates an exemplary access point identification (APIDM) message for use by the femto node shown in FIG. 2.

FIG. 8 illustrates an exemplary access point identification message (APIDM) 800 for use by the femto node 210 shown in FIG. 2. As described above with respect to FIG. 2, the femto node 210 may be configured to generate an APIDM message 800 which includes an MSC ID and a CELL ID to facilitate identification of hand in targets. The APIDM message 800 may comprise an association type field 810. The association type field 810 comprises three bits. The association type field 810 may be used for indicating the types of relationship that the femto node 210 may have with ATs such as the AT 222. For example, the values of the association type field 810 may denote that the AT 222 is able to freely communicate with the femto node 210. An alternative value may denote that the AT 222 is free to receive signaling information but may not receive other service. Another value may indicate that only ATs explicitly authorized to communicate with the femto node 210 may receive service. Other values of the association type field 810 may be used for other association types.

The APIDM message 800 may further comprise a plurality of identifier fields. For example, the APIDM message 800 may comprise a system identification (SID) field 820 comprising 15 bits, a network identification (NID) field 830 comprising 16 bits, and an femto node or access point identification (AP_ID) field 850 comprising a variable number of bits. In one embodiment, the length of the AP_ID field 850 may be included in the APIDM message 800 in a separate field. For example, the length of the AP_ID may be encoded in the AP_ID_LEN field 840. The SID field 820, NID field 830, and AP_ID field 850 taken together may define a globally unique identifier for a particular femto node. The AT 222 may be configured to use one or more of the identifier fields 820, 830, 850 to determine whether or not to attempt to communicate with the femto node 210. For example, as described above the AT 222 may maintain a white list of femto nodes with which to communicate or a black list of femto nodes to avoid. By comparing one or more identifiers with the lists, the AT 222 may quickly determine whether or not to solicit AT 222 for service. The APIDM message 800 may further comprise an AP_ID_MASK field 860. In one embodiment, the AP_ID_MASK field 860 may comprise eight bits. The AP_ID_MASK field 860 may be used as a mask to identify multiple femto nodes associated with a single owner or organization.

The APIDM message may further comprise an MSC_ID field 870. In one embodiment, the MSC_ID field may comprise 24 bits. As described above, the MSC_ID field 870 may contain an MSC ID value which is used to facilitate identification of a hand in target. The MSC ID value may be used by the MSC 252 to identify the MFIF 254 associated with the femto node 210. Using the MSC ID the MSC 252 may route information to the MFIF 254 to facilitate the hand in process.

The APIDM message may further comprise a CELL_ID field 880. In one embodiment the CELL_ID field 880 may comprise 16 bits. As described above, the CELL_ID field 880 may contain a CELL ID value which is used to facilitate identification of a hand in target. The CELL ID value may be used by the MFIF 254 to identify the femto node 210 as a hand in target. Using the CELL ID the MFIF 254 may route information to the femto node 210 to facilitate the hand in process.

The APIDM message 800 may further comprise additional optional fields 890 of variable length. These optional fields 890 may be used for other signaling purposes or system enhancements. It will be appreciated that the APIDM message 800 is an exemplary embodiment of a message for facilitating the identification of hand in targets. The order of the fields in the message and the length of the fields in the message are provided as an example and may be altered to accommodate implementation considerations. In addition, certain fields may be added or removed from the message.

Figure 9:
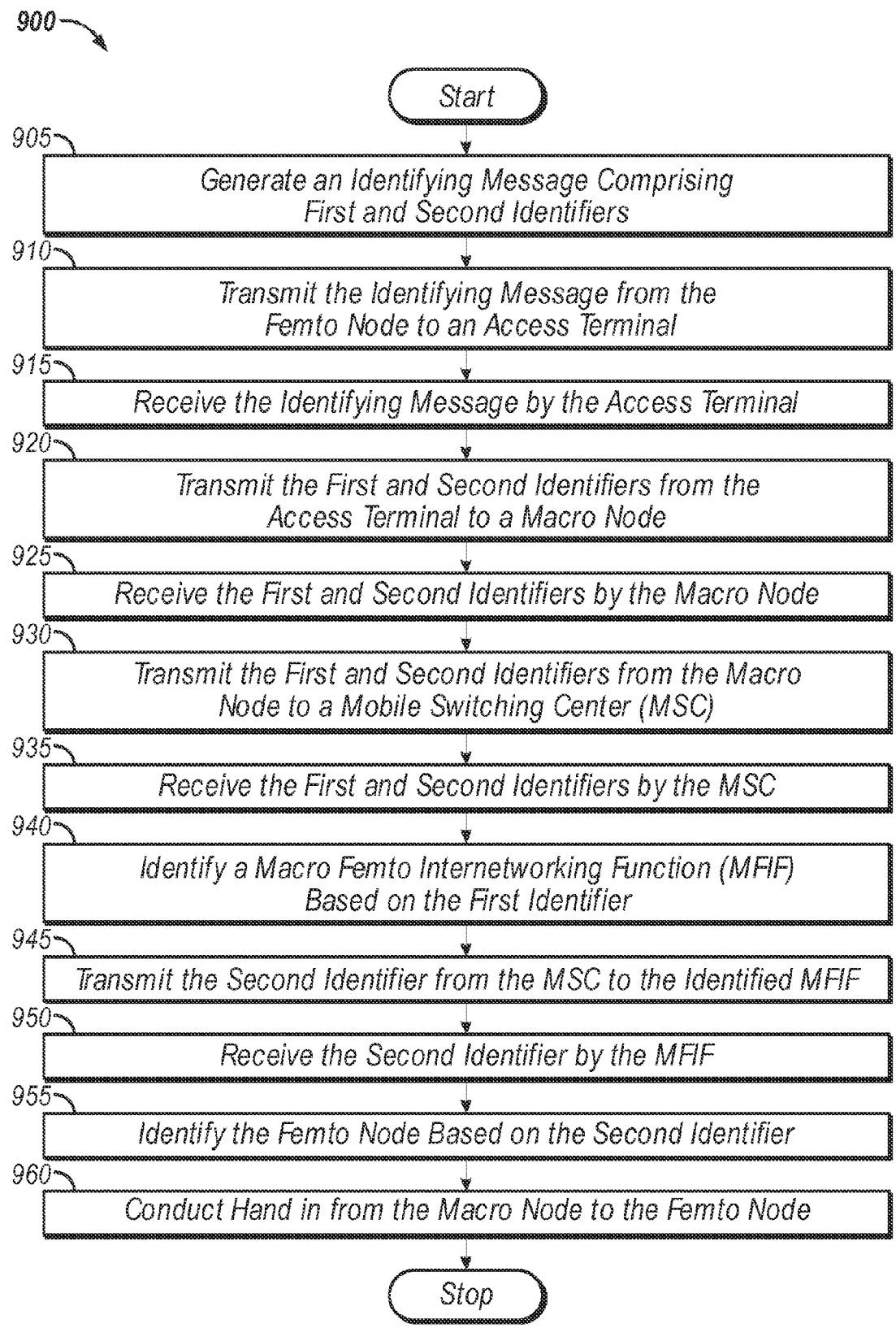
FIG. 9 is a flowchart of an exemplary process for performing a handoff from a macro node to a femto node shown in FIG. 2.

FIG. 9 is a flowchart of an exemplary process for performing a handoff from a macro node to a femto node shown in FIG. 2. As described above with respect to FIG. 2, the process 900 may be used to help identify femto nodes during a hand in process. To facilitate the hand in, the femto node 210 generates an identifying message comprising first and second identifiers as shown in step 905. As described above, the identifying message may comprise an APIDM message as shown in FIG. 8. Further, the first identifier may comprise an MSC ID and the second identifier may comprise a CELL ID. In one embodiment, the femto node 210 may receive the MSC ID and the CELL ID from the MFIF 254. In another embodiment, the femto node 210 may be configured to receive the MSC ID and CELL ID from the macro node 205. The femto node 210 may be configured to store the MSC ID and CELL ID to memory. In one embodiment, the femto node 210 may generate the identifying message once and store the generated message in memory for repeated subsequent use. Alternatively, the femto node 210 may generate a new identifying message periodically or for each transmission. After, the femto node 210 generates the identifying message, the femto node 210 transmits the identifying message to the access terminal (AT) 222 as shown in step 910. As described above, the femto node 210 may transmit the identifying message at regular intervals. Alternatively, the femto node 210 may transmit the identifying message responsive to detecting the presence of the AT 222 or responsive to another stimulus. As described above, the femto node 210 may also transmit a pilot signal to the AT 222. In one embodiment, the pilot signal and identifying message may be transmitted on different logical channels to the AT 222. After the femto node 210 transmits the identifying message, the AT 222 receives the identifying message as shown in step 915. As described above, the AT 222 may process the received identifying message to obtain the first and second identifiers. After receiving the identifying message, the AT 222 transmits the first and second identifiers to the macro node 205 as shown in step 920. As described above, the AT 222 may transmit the first and second identifiers to the macro node 205 responsive to receiving the first and second identifiers from the femto node 210. In another example, the AT 222 may transmit the first and second identifiers to the macro node 205 based upon one or more handoff criteria. Alternatively, the AT 222 may transmit the first and second identifiers to the macro node 205 responsive to a request from the macro node 205 for information about the femto node 210. After the AT 222 transmits the first and second identifiers to the macro node 205, the macro node 205 receives the first and second identifiers as shown in step 925. As described above, the macro node 205 may also determine, based on or more hand off criteria, to pursue a handoff to the femto node 210. After the macro node 205 receives the first and second identifiers, the macro node 205 transmits the first and second identifiers to the mobile switching center (MSC) 252 as shown in step 930. The MSC 252 then receives the first and second identifiers from the macro node 205 as shown in step 935.

After receiving the first and second identifiers, the MSC 252 identifies the macro femto internetworking function (MFIF) 254 associated with the femto node 210 based, at least in part, on the first identifier as shown in step 940. As described above, the first identifier may be an MSC ID and the MSC 252 may maintain a data structure, e.g., a list or table, associating particular MFIFs with particular MSC IDs. The MSC 252 may use the MSC ID provided by the femto node 210 to identify the MFIF 254 associated with the femto node 210. After the MSC 252 identifies the MFIF 254 based on the first identifier, the MSC 252 transmits the second identifier to the MFIF 254 as shown in step 945. The MFIF 254 then receives the second identifier as shown in step 950. After receiving the second identifier, the MFIF 254 identifies the femto node 210 based, at least in part, on the second identifier as shown in step 955. As described above, the second identifier may comprise a CELL ID and the MFIF 254 may maintain a data structure, e.g., a list or table, associating particular femto nodes with particular CELL IDs. The MFIF 254 may use the CELL ID provided by the femto node 210 to identify the femto node 210. After the MFIF identifies the femto node 210, the hand in from the macro node 205 to the femto node 210 is conducted as shown in step 960. As described above, conducting the hand in may comprise the transmission and receipt of messages between the macro node 205, the MSC 252, the MFIF 254, the Internet 240, the femto node 210, and the AT 222. For example, a hand in request originating from the macro node 205 may be passed to the MFIF 254 via the MSC 252. The MFIF may transmit the hand in request to the femto node 210. The femto node 210 may accept the request and send an acknowledgement to the MFIF 254. The MFIF 254 may forward the acknowledgement to the macro node 205 via the MSC 252. The macro node 205 may then instruct the AT 222 to hand in to the femto node 210. Alternatively, the macro node 205 may communicate directly with the femto node 210 to facilitate the hand in.

Figure 10:
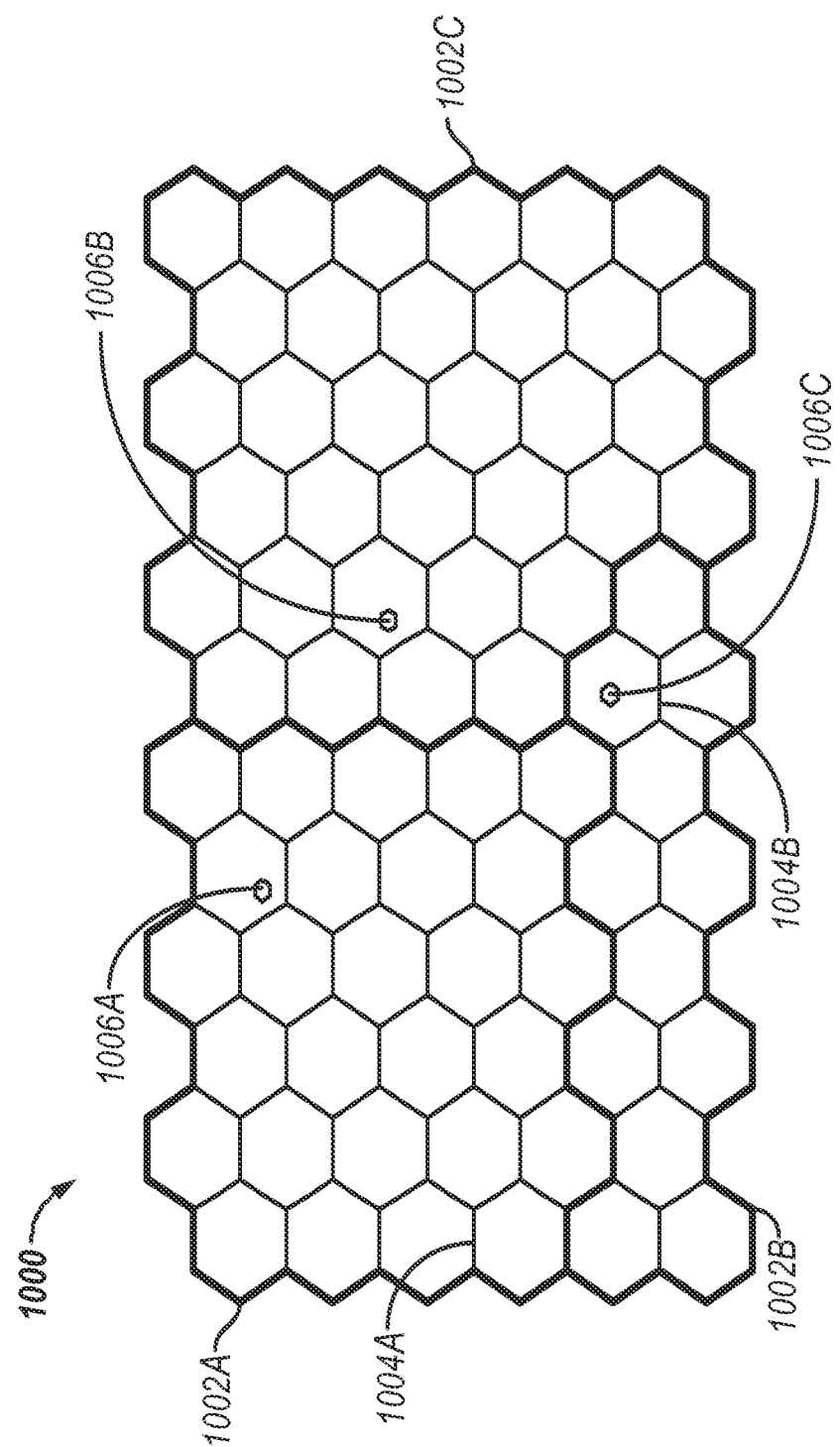
FIG. 10 illustrates exemplary coverage areas for wireless communication networks as shown, e.g., in FIGS. 1 and 2.

FIG. 10 illustrates exemplary coverage areas for wireless communication networks as shown, e.g., in FIGS. 1 and 2. The coverage area 1000 may comprise one or more geographical areas in which the AT 220 may access the communication network 250 as discussed above with respect to FIG. 2. As shown the coverage area 1000 comprises several tracking areas 1002 (or routing areas or location areas). Each tracking area 1002 comprises several macro areas 1004, which may be similar to the macro area 230 described above with respect to FIG. 2. Here, areas of coverage associated with tracking areas 1002A, 1002B, and 1002C are shown as delineated by wide lines as and the macro areas 1004 are represented by hexagons. The tracking areas 1002 may also comprise femto areas 1006, which may be similar to the femto area 230 described above with respect to FIG. 2. In this example, each of the femto areas 1006 (e.g., femto area 1006C) is depicted within a macro area 1004 (e.g., macro area 1004B). It should be appreciated, however, that a femto area 1006 may not lie entirely within a macro area 1004. In practice, a large number of femto areas 1006 may be defined with a given tracking area 1002 or macro area 1004. Also, one or more pico areas (not shown) may be defined within a given tracking area 1002 or macro area 1004.

Referring again to FIG. 2, the owner of the femto node 210 may subscribe to a mobile service, such as, for example, 3G mobile service, offered through the communication network 250 (e.g., a mobile operator core network). In addition, an access terminal 222 may be capable of operating both in macro environments (e.g., macro areas) and in smaller scale (e.g., residential, femto areas, pico areas, etc.) network environments. In other words, depending on the current location of the access terminal 222, the access terminal 222 may access the communication network 250 by a macro node 205 or by any one of a set of femto nodes (e.g., femto nodes 210, 212). For example, when a subscriber is outside his home, he may be served by a macro node (e.g., node 205) and when the subscriber is at home, he may be served by a femto node (e.g., node 210). It should further be appreciated that the femto nodes 210 may be backward compatible with existing access terminals 222.

The femto node 210 may communicate over a single frequency or, in the alternative, over multiple frequencies. Depending on the particular configuration, the single frequency or one or more of the multiple frequencies may overlap with one or more frequencies used by a macro node (e.g., node 250).

In one embodiment, an access terminal 222 may be configured to connect to a particular (e.g., preferred) femto node (e.g., a home femto node of the access terminal 222) whenever the access terminal 222 is within communication range of the femto node. For example, the access terminal 222 may communicate with only the femto node 210 when the access terminal 222 is within the femto area 215.

In another embodiment, the access terminal 221 is communicating with a node but is not communicating with a preferred node (e.g., as defined in a preferred roaming list). In this embodiment, the access terminal 221 may continue to search for a preferred node (e.g., the preferred femto node 210) using a Better System Reselection ("BSR"). The BSR may comprise a method comprising a periodic scanning of available systems to determine whether better systems are currently available. The BSR may further comprise attempting to associate with available preferred systems. The access terminal 222 may limit the BSR to scanning over one or more specific bands and/or channels. Upon discovery of a preferred femto node 210, the access terminal 222 selects the femto node 210 for communicating with to access the communication network 250 within the femto area 215.

In one embodiment, a node may only provide certain services to certain access terminals. Such a node may be referred to as a "restricted" or "closed" node. In wireless communication networks comprising restricted femto nodes, a given access terminal may only be served by macro nodes and a defined set of femto nodes (e.g., the femto node 210). In other embodiments, a node may be restricted to not provide at least one of: signaling, data access, registration, paging, or service.

In one embodiment, a restricted femto node (which may also be referred to as a Closed Subscriber Group Home NodeB) is one that provides service to a restricted provisioned set of access terminals. This set may be temporarily or permanently changed to include additional or fewer access terminals as necessary. In some aspects, a Closed Subscriber Group ("CSG") may be defined as the set of access nodes (e.g., femto nodes) that share a common access control list of access terminals (e.g., a list of the restricted provisioned set of access terminals). A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node. A guest access terminal may refer to an access terminal with temporary access to the restricted femto node. An alien access terminal may refer to an access terminal that does not have permission to access the restricted femto node, except for perhaps emergency situations, such as 911 calls.

For convenience, the disclosure herein describes various functionalities related to a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each access terminal may communicate with one or more nodes via transmissions on the forward and reverse links. The forward link (or downlink) refers to the communication link from the node to the access terminal, and the reverse link (or uplink) refers to the communication link from the access terminal to the node. This communication link may be established via a single-in-single-out system, a multiple-in-multiple-out ("MIMO") system, or some other type of system.

A MIMO system employs multiple (NT) transmit antennas and multiple (NR) receive antennas for data transmission. A MIMO channel formed by the NT transmit and NR receive antennas may be comprise NS independent channels, which are also referred to as spatial channels, where NS≤min {NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables a device (e.g., a node, an access terminal, etc.) to extract a transmit beam-forming gain on the forward link when multiple antennas are available at the device.

The teachings herein may be incorporated into a device (e.g., a node, an access terminal, etc.) employing various components for communicating with at least one other device.

Figure 11:
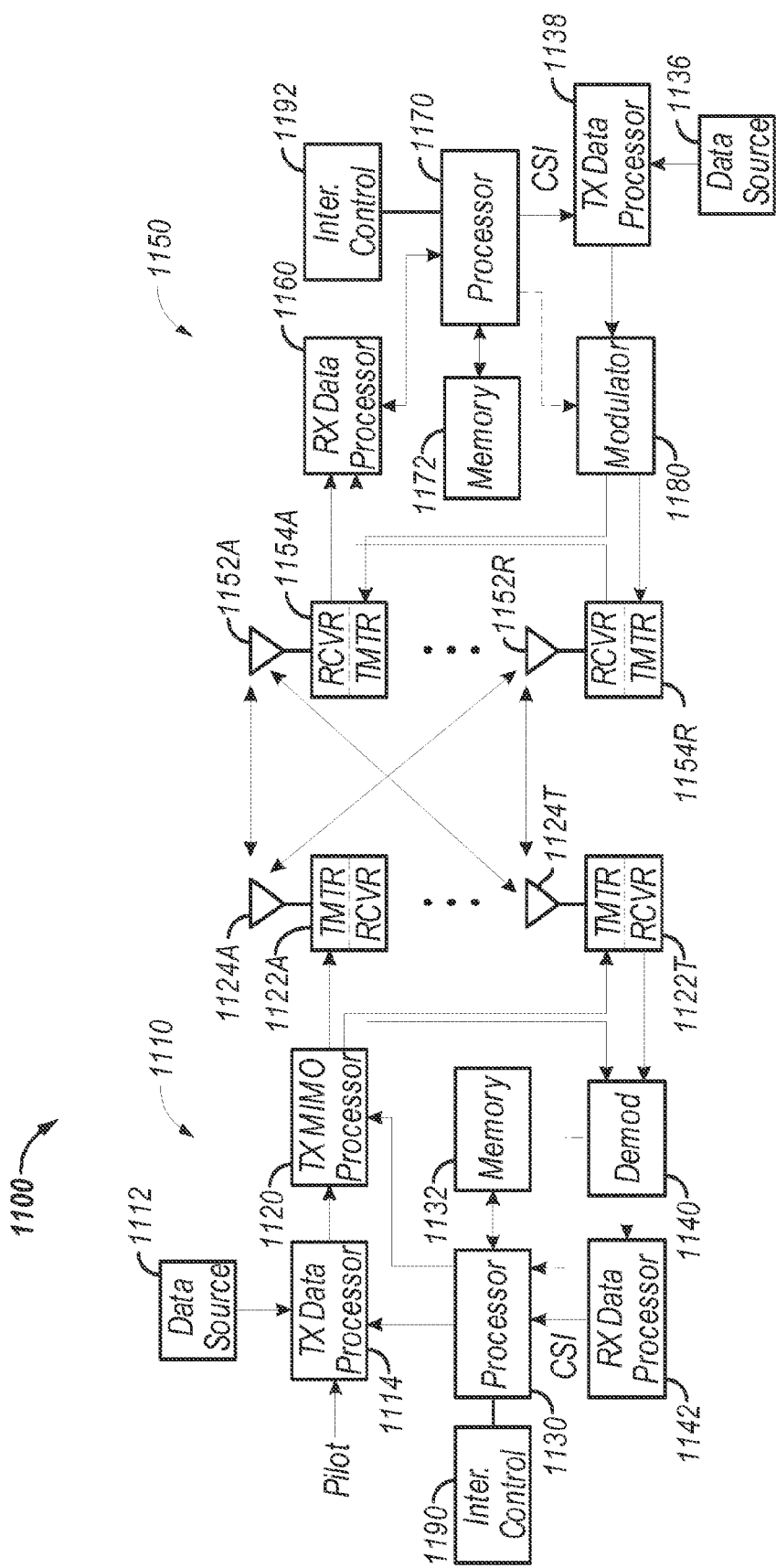
FIG. 11 is a functional block diagram of another exemplary node and another exemplary access terminal shown in FIG. 2.

FIG. 11 is a functional block diagram of another exemplary node and another exemplary access terminal shown in FIG. 2. As shown a MIMO system 1100 comprises a wireless device 1110 (e.g., the femto node 210, 212, the macro node 205, etc.) and a wireless device 1150 (e.g., the AT 222). At the device 1110, traffic data for a number of data streams is provided from a data source 1112 to a transmit ("TX") data processor 1114.

In one embodiment, each data stream is transmitted over a respective transmit antenna. The TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides NT modulation symbol streams to NT transceivers ("XCVR") 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1122A through 1122T are then transmitted from NT antennas 1124A through 1124T, respectively.

At the device 1150, the transmitted modulated signals are received by NR antennas 1152A through 1152R and the received signal from each antenna 1152 is provided to a respective transceiver ("XCVR") 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive ("RX") data processor 1160 then receives and processes the NR received symbol streams from NR transceivers 1154 based on a particular receiver processing technique to provide NT "detected" symbol streams. The RX data processor 1160 then demodulates, deinterleaves, and decodes each detected symbol stream to recover the traffic data for the data stream. The processing performed by the RX data processor 1160 is complementary to that performed by the TX MIMO processor 1120 and the TX data processor 1114 at the device 1110.

A processor 1170 periodically determines which pre-coding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138. The TX data processor 1138 also receives traffic data for a number of data streams from a data source 1136. The modulator 1180 modulates the data streams. Further, the transceivers 1154A through 1154R condition the data streams and transmits the data streams back to the device 1110.

At the device 1110, the modulated signals from the device 1150 are received by the antennas 1124. Further, the transceivers 1122 condition the modulated signals. A demodulator ("DEMOD") 1140 demodulates the modulated signals. A RX data processor 1142 processes the demodulated signals and extracts the reverse link message transmitted by the device 1150. The processor 1130 then determines which pre-coding matrix to use for determining the beam-forming weights. Further, the processor 1130 processes the extracted message.

Further, the device 1110 and/or the device 1150 may comprise one or more components that perform interference control operations as taught herein. For example, an interference ("INTER") control component 1190 may cooperate with the processor 1130 and/or other components of the device 1110 to send/receive signals to/from another device (e.g., device 1150) as taught herein. Similarly, an interference control component 1192 may cooperate with the processor 1170 and/or other components of the device 1150 to send/receive signals to/from another device (e.g., device 1110). It should be appreciated that for each device 1110 and 1150 the functionality of two or more of the described components may be provided by a single component. For example, a single processing component may provide the functionality of the interference control component 1190 and the processor 1130. Further, a single processing component may provide the functionality of the interference control component 1192 and the processor 1170.

Figure 12:
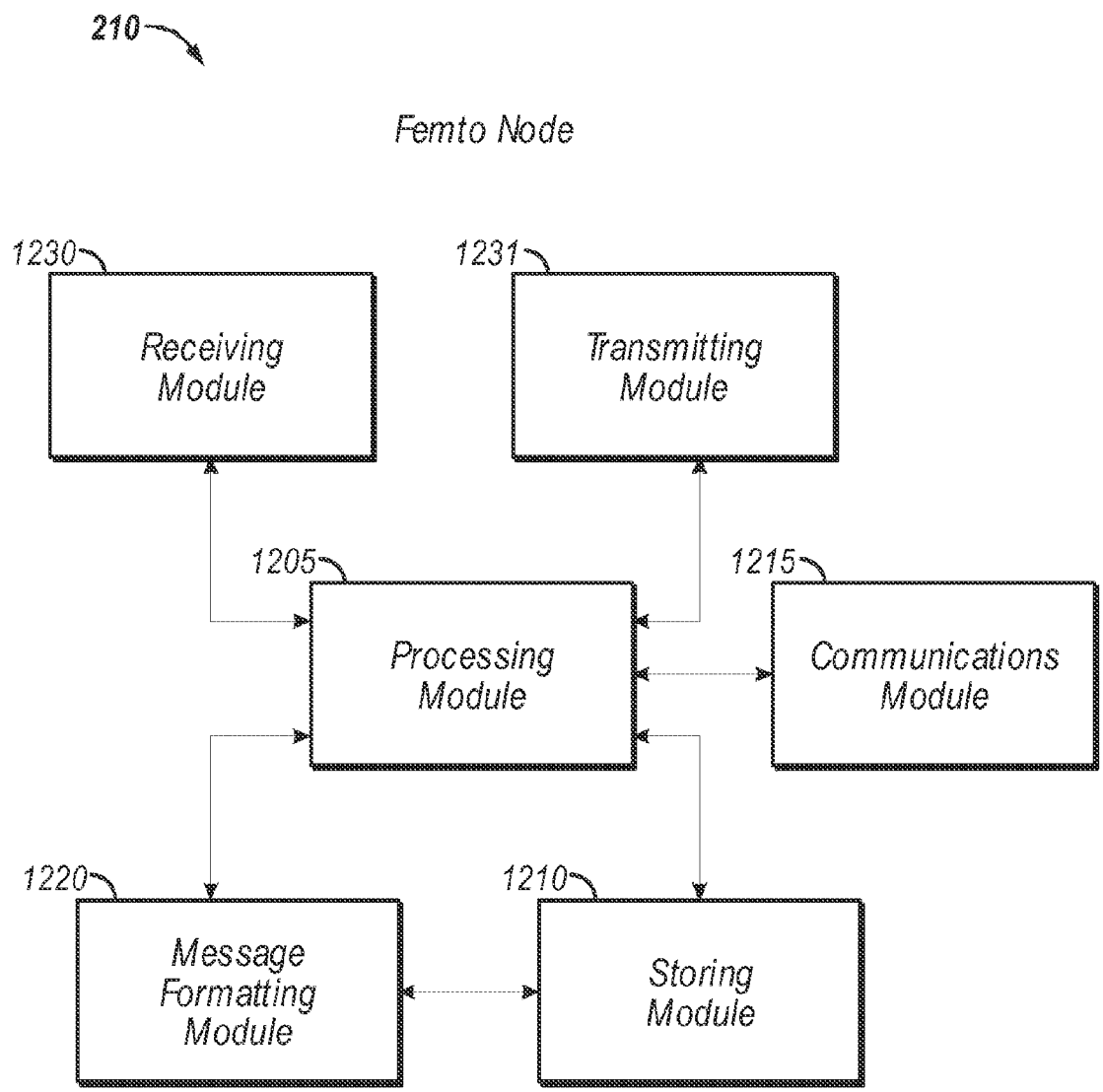
FIG. 12 is a functional block diagram of yet another exemplary femto node shown in FIG. 2.
Figure 13:
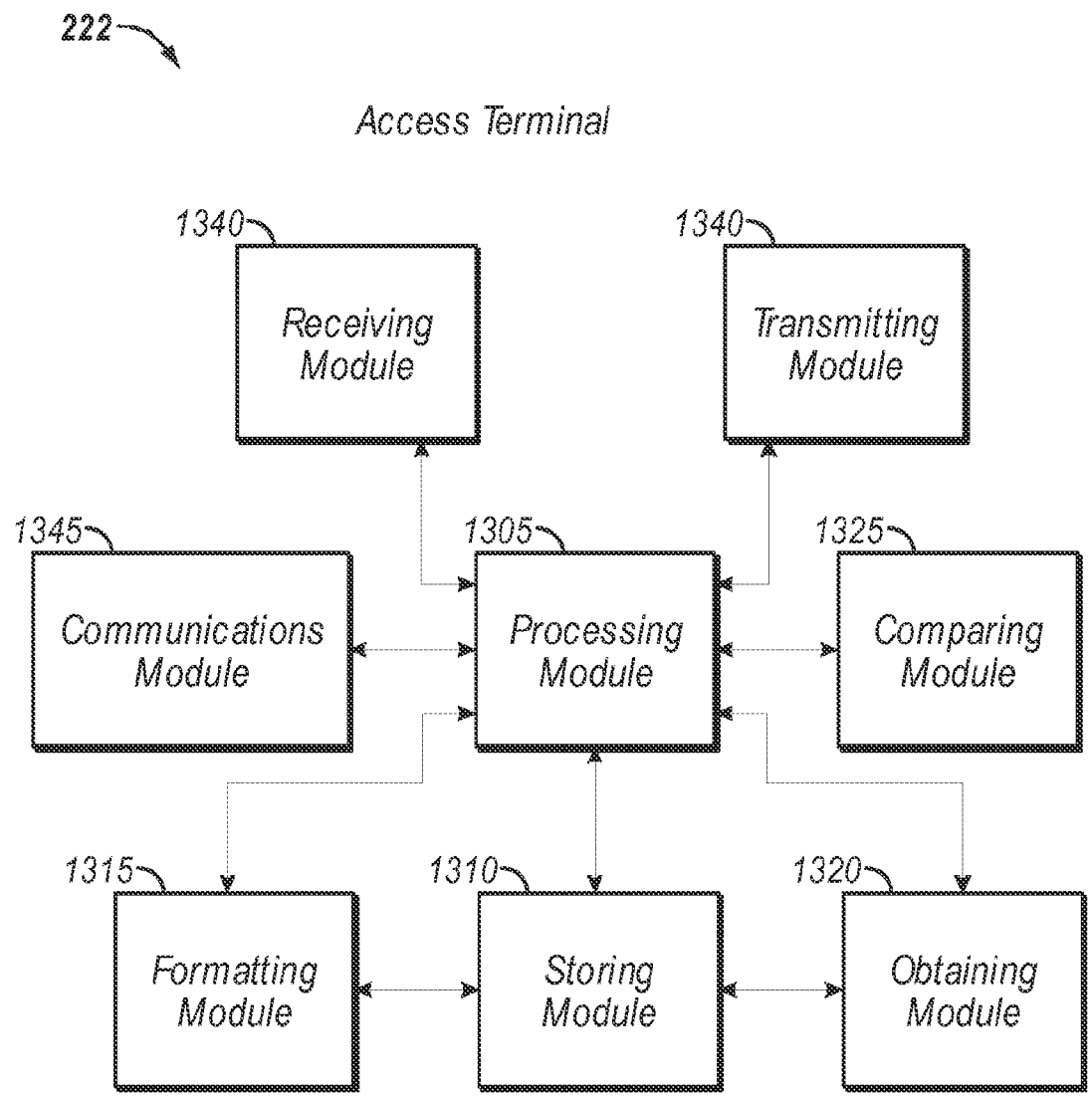
FIG. 13 is a functional block diagram of yet another exemplary access terminal shown in FIG. 2.

The functionality described herein (e.g., with regard to one or more of the accompanying figures) may correspond in some aspects to similarly designated "means for" functionality in the appended claims. Referring to FIGS. 12-13, apparatuses 1200, and 1300 are represented as a series of interrelated functional modules.

FIG. 12 is a functional block diagram of yet another exemplary femto node shown in FIG. 2. As shown, the femto node 210 may comprise a processing module 1205, a storing module 1210, a communications module 1215, a message formatting module 1220, a receiving module 1230, and a transmitting module 1231. The processing module 1205 may correspond at least in some aspects to, for example, a processor as discussed herein. The storing module 1210 may correspond at least in some aspects to, for example, a memory as discussed herein. The communications module may correspond at least in some aspects to, for example, a processor as discussed herein. The message formatting module 1220 may correspond at least in some aspects to, for example, a message formatter as discussed herein. The receiving module 1230 may correspond at least in some aspects to, for example, a wired or wireless network interface as discussed herein. The transmitting module 1231 may correspond at least in some aspects to, for example, a wired or wireless network interface as discussed herein.

FIG. 13 is a functional block diagram of yet another exemplary access terminal shown in FIG. 2. As shown, the AT 222 may comprise a processing module 1305, a storing module 1310, a formatting module 1315, an obtaining module 1320, a comparing module 1325, a receiving module 1340, and a transmitting module 1341, and a communications module 1345. The processing module 1305 may correspond at least in some aspects to, for example, a processor as discussed herein. The storing module 1310 may correspond at least in some aspects to, for example, a memory as discussed herein. The formatting module 1315 may correspond at least in some aspects to, for example, a message formatter as discussed herein. The obtaining module 1320 may correspond at least in some aspects to, for example, a message interpreter as discussed herein. The comparing module 1325 may correspond at least in some aspects to, for example, a message interpreter as discussed herein. The receiving module 1340 may correspond at least in some aspects to, for example, a wireless network interface as discussed herein. The transmitting module 1341 may correspond at least in some aspects to, for example, a wireless network interface as discussed herein. The communications module 1345 may correspond at least in some aspects to, for example, a processor as discussed herein.

The functionality of the modules of FIGS. 12-13 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

The embodiments presented herein and other embodiments are further described in greater detail in the attached Appendix. While the specification describes particular examples of the present invention, those of ordinary skill can devise variations of the present invention without departing from the inventive concept. For example, the teachings herein refer to circuit-switched network elements but are equally applicable to packet-switched domain network elements.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method of communicating between an access terminal and a femto node, the method comprising:
   transmitting a known signal from the femto node to the access terminal, the known signal being configured to be compared to a reference signal by the access terminal;
   transmitting a first message from the femto node to the access terminal, wherein the first message is separate from the known signal and comprises an identifier that uniquely identifies the femto node;
   receiving a second message, by the femto node, the second message comprising information facilitating a hand in of the access terminal from a macro node to the femto node, wherein the femto node is identified as a hand in target based, at least in part, on the identifier; and
   communicating with the access terminal in response to the second message.

2. The method of claim 1, further comprising receiving, by the femto node, the identifier from a femto switch.

3. The method of claim 1, wherein transmitting the first message comprises broadcasting the first message periodically.

4. The method of claim 1, wherein receiving the second message comprises receiving the second message from the macro node.

5. The method of claim 1, wherein receiving the second message comprises receiving the second message from a femto switch.

6. The method of claim 1, wherein the known signal comprises a pilot signal for determining signal strength of the known signal, upon receipt at the access terminal, by comparison to the reference signal.

7. The method of claim 1, wherein the identifier comprises a first value associating the femto node with a femto switch and a second value associating the femto switch with a mobile switching center.

8. The method of claim 1, wherein the identifier comprises at least one of an Access Point Identifier, a Femto Equipment Identifier, an Ethernet Media Access Control address, a Sector Identifier, a Base Station Identifier, and an Internet Protocol address.

9. The method of claim 1, wherein the macro node is configured to provide communication coverage to the access terminal within a first area, the femto node is configured to provide the communication coverage to the access terminal within a second area, and the first area is larger than the second area.

10. The method of claim 1, wherein the femto node, access terminal, and macro node each comprise a transceiver.

11. The method of claim 1, wherein the first message is transmitted on a different channel than the known signal.

12. A wireless communication apparatus comprising:
    a transmitter configured to:
    transmit a known signal to an access terminal, the known signal identifying the transmitter as a femto node transmitter, the known signal being configured to be compared to a reference signal by the access terminal, and transmit an identifier to the access terminal, the identifier being separate from the known signal and uniquely identifying the transmitter;

a receiver configured to receive a message, the message comprising information facilitating a hand in of the access terminal from a macro node to the transmitter and receiver, wherein the transmitter and receiver are identified as a hand in target based, at least in part, on the identifier; and a processing circuit configured to establish a communication link between the transmitter and/or receiver and the access terminal in response to the message.

13. The wireless communication apparatus of claim 12, wherein the receiver is further configured to receive the identifier from a femto switch.

14. The wireless communication apparatus of claim 12, wherein the transmitter is configured to broadcast the identifier periodically.

15. The wireless communication apparatus of claim 12, wherein the receiver is configured to receive the message from the macro node.

16. The wireless communication apparatus of claim 12, wherein the receiver is configured to receive the message from a femto switch.

17. The wireless communication apparatus of claim 12, wherein the known signal comprises a pilot signal for determining signal strength of the known signal, upon receipt at the access terminal, by comparison to the reference signal.

18. The wireless communication apparatus of claim 12, wherein the identifier comprises a first value associating the transmitter and receiver with a femto switch and a second value associating the femto switch with a mobile switching center.

19. The wireless communication apparatus of claim 12, wherein the identifier comprises at least one of an Access Point Identifier, a Femto Equipment Identifier, an Ethernet Media Access Control address, a Sector Identifier, a Base Station Identifier, and an Internet Protocol address.

20. The wireless communication apparatus of claim 12, wherein the macro node is configured to provide communication coverage to the access terminal within a first area, the transmitter and receiver are configured to provide the communication coverage to the access terminal within a second area, and the first area is larger than the second area.

21. The wireless communication apparatus of claim 12, wherein the access terminal and the macro node each comprise a transceiver.

22. A non-transitory computer-readable medium comprising:

code for causing a computer to transmit a known signal from a femto node to an access terminal, the known signal being configured to be compared to a reference signal by the access terminal;

code for causing the computer to transmit a first message from the femto node to the access terminal, wherein the first message is separate from the known signal and comprises an identifier that uniquely identifies the femto node;

code for causing the computer to receive a second message, by the femto node, the second message comprising information facilitating a hand in of the access terminal from a macro node to the femto node, wherein the femto node is identified as a hand in target based, at least in part, on the identifier; and code for causing the computer to communicate with the access terminal in response to the second message.

23. The non-transitory computer-readable medium of claim 22, further comprising code for causing the computer to receive, by the femto node, the identifier from a femto switch.

24. The non-transitory computer-readable medium of claim 22, wherein the code for causing the computer to transmit the first message comprises code for causing the computer to broadcast the first message periodically.

25. The non-transitory computer-readable medium of claim 22, wherein the code for causing the computer to receive the second message comprises code for causing the computer to receive the second message from the macro node.

26. The non-transitory computer-readable medium of claim 22, wherein the code for causing the computer to receive the second message comprises code for causing the computer to receive the second message from a femto switch.

27. The non-transitory computer-readable medium of claim 22, wherein the known signal comprises a pilot signal for determining signal strength of the known signal, upon receipt at the access terminal, by comparison to the reference signal.

28. The non-transitory computer-readable medium of claim 22, wherein the identifier comprises a first value associating the femto node with a femto switch and a second value associating the femto switch with a mobile switching center.

29. The non-transitory computer-readable medium of claim 22, wherein the identifier comprises at least one of an Access Point Identifier, a Femto Equipment Identifier, an Ethernet Media Access Control address, a Sector Identifier, a Base Station Identifier, and an Internet Protocol address.

30. The non-transitory computer-readable medium of claim 22, wherein the macro node is configured to provide communication coverage to the access terminal within a first area, the femto node is configured to provide the communication coverage to the access terminal within a second area, and the first area is larger than the second area.

31. The non-transitory computer-readable medium of claim 22, wherein the femto node, access terminal, and macro node each comprise a transceiver.

32. A wireless communication apparatus comprising:

means for transmitting a known signal to an access terminal, the known signal identifying the transmitting means as a femto node transmitting means, the known signal being configured to be compared to a reference signal by the access terminal, and for transmitting an identifier to the access terminal, the identifier being separate from the known signal and uniquely identifying the transmitting means;

means for receiving a message, the message comprising information facilitating a hand in of the access terminal from a macro node to the transmitting and receiving means, wherein the transmitting and receiving means are identified as a hand in target based, at least in part, on the identifier; and means for establishing a communication link between the transmitting and receiving means and the access terminal in response to the message.

33. The wireless communication apparatus of claim 32, further comprising means for receiving the identifier from a femto switch.

34. The wireless communication apparatus of claim 32, wherein transmitting the identifier comprises broadcasting the identifier periodically.

35. The wireless communication apparatus of claim 32, wherein receiving the message comprises receiving the message from the macro node.

36. The wireless communication apparatus of claim 32, wherein receiving the message comprises receiving the message from a femto switch.

37. The wireless communication apparatus of claim 32, wherein the known signal comprises a pilot signal for determining signal strength of the known signal, upon receipt at the access terminal, by comparison to the reference signal.

38. The wireless communication apparatus of claim 32, wherein the identifier comprises a first value associating the transmitting and receiving means with a femto switch and a second value associating the femto switch with a mobile switching center.

39. The wireless communication apparatus of claim 32, wherein the identifier comprises at least one of an Access Point Identifier, a Femto Equipment Identifier, an Ethernet Media Access Control address, a Sector Identifier, a Base Station Identifier, and an Internet Protocol address.

40. The wireless communication apparatus of claim 32, wherein the macro node is configured to provide communication coverage to the access terminal within a first area, the transmitting and receiving means are configured to provide the communication coverage to the access terminal within a second area, and the first area is larger than the second area.

41. The wireless communication apparatus of claim 32, wherein the access terminal and the macro node each comprise a transceiver.

42. A wireless communication apparatus comprising:
a receiver configured to:
receive a predetermined signal from a femto node, and
receive a first message from the femto node, the first message being separate from the predetermined signal and comprising an identifier that uniquely identifies the femto node;
a processing circuit configured to:
determine signal strength of the received predetermined signal, based, at least in part, on comparing the received predetermined signal to a reference signal, and
obtain the identifier from the first message; and
a transmitter configured to transmit the identifier to a macro node, wherein the femto node is identified as a hand in target based, at least in part, on the identifier, wherein the receiver is further configured to receive a second message, the second message comprising information facilitating a hand in of the transmitter and receiver from the macro node to the femto node, wherein the processing circuit is further configured to establish a communication link between the transmitter and/or receiver and the femto node in response to the second message.

43. The wireless communication apparatus of claim 42, wherein the receiver is configured to receive the second message from the macro node.

44. The wireless communication apparatus of claim 42, wherein the receiver is configured to receive the second message from the femto node.

45. The wireless communication apparatus of claim 42, wherein the predetermined signal comprises a pilot signal.

46. The wireless communication apparatus of claim 42, wherein the identifier comprises a first value associating the femto node with a femto switch and a second value associating the femto switch with a mobile switching center.

47. The wireless communication apparatus of claim 42, wherein the identifier comprises at least one of an Access Point Identifier, a Femto Equipment Identifier, an Ethernet Media Access Control address, a Sector Identifier, a Base Station Identifier, and an Internet Protocol address.

48. The wireless communication apparatus of claim 42, wherein the macro node is configured to provide communication coverage to the receiver and transmitter within a first area, the femto node is configured to provide the communication coverage to the receiver and transmitter within a second area, and the first area is larger than the second area.

49. The wireless communication apparatus of claim 42, wherein the femto node and the macro node each comprise a transceiver.

50. A wireless communication method for an access terminal, comprising:
receiving a predetermined signal from a femto node;
determining signal strength of the received predetermined signal, based, at least in part, on comparing the received predetermined signal to a reference signal;
receiving a first message from the femto node, the first message being separate from the predetermined signal and comprising an identifier that uniquely identifies the femto node;
obtaining the identifier from the first message;
transmitting the identifier to a macro node, wherein the femto node is identified as a hand in target based, at least in part, on the identifier;
receiving a second message, the second message comprising information facilitating a hand in of a transmitter and a receiver from the macro node to the femto node; and
establishing a communication link between the access terminal and the femto node in response to the second message.

51. A wireless communication apparatus, comprising:
means for receiving a predetermined signal from a femto node;
means for determining signal strength of the received predetermined signal, based, at least in part, on comparing the received predetermined signal to a reference signal;
means for receiving a first message from the femto node, the first message being separate from the predetermined signal and comprising an identifier that uniquely identifies the femto node;
means for obtaining the identifier from the first message;
means for transmitting the identifier to a macro node, wherein the femto node is identified as a hand in target based, at least in part, on the identifier;
means for receiving a second message, the second message comprising information facilitating a hand in of a transmitter and a receiver from the macro node to the femto node; and
means for establishing a communication link with the femto node in response to the second message.

52. A non-transitory computer-readable medium, comprising:
code for causing a computer to receive a predetermined signal from a femto node;
code for causing the computer to determine signal strength of the received predetermined signal, based, at least in part, on comparing the received predetermined signal to a reference signal;
code for causing the computer to receive a first message from the femto node, the first message being separate from the predetermined signal and comprising an identifier that uniquely identifies the femto node;
code for causing the computer to obtain the identifier from the first message;
code for causing the computer to transmit the identifier to a macro node, wherein the femto node is identified as a hand in target based, at least in part, on the identifier;

code for causing the computer to receive a second message, the second message comprising information facilitating a hand in of a transmitter and a receiver from the macro node to the femto node; and code for causing the computer to establish a communication link with the femto node in response to the second message.

\* \* \* \* \*